United States Patent
Ahdritz et al.

(10) Patent No.: US 10,319,040 B1
(45) Date of Patent: Jun. 11, 2019

(54) CONTROL OF THE GENERATION AND DISPLAY OF ROYALTY ADMINISTRATION AND RIGHTS MANAGEMENT DATA BASED ON THE USER'S RIGHTS OF ACCESS

(71) Applicant: Kobalt Music Group Limited, London (GB)

(72) Inventors: Willard Bengt Anders Ahdritz, Scarsdale, NY (US); Raphael Willy Robert Amselli, Essex (GB); Simon Thomas Dennett, New York, NY (US); James Piers Fitzherbert-Brockholes, Isle of Wight (GB); Richard Alwin Curtis Thompson, London (GB)

(73) Assignee: KTech Services Limited, London (GB)

( * ) Notice: Subject to any disclaimer, the term of this patent is extended or adjusted under 35 U.S.C. 154(b) by 0 days.

(21) Appl. No.: 13/829,664

(22) Filed: Mar. 14, 2013

(51) Int. Cl.
| | | |
|---|---|---|
| *G06Q 30/02* | (2012.01) | |
| *G06Q 30/08* | (2012.01) | |
| *G06Q 30/06* | (2012.01) | |
| *G06Q 40/00* | (2012.01) | |

(52) U.S. Cl.
CPC ......... *G06Q 40/10* (2013.01); *G06Q 30/0222* (2013.01); *G06Q 30/06* (2013.01); *G06Q 30/0623* (2013.01); *G06Q 30/08* (2013.01)

(58) Field of Classification Search
CPC .... G06Q 30/06; G06Q 30/0623; G06Q 30/08; G06Q 30/0222
See application file for complete search history.

(56) References Cited

U.S. PATENT DOCUMENTS

| | | | | |
|---|---|---|---|---|
| 6,282,653 | B1* | 8/2001 | Berstis et al. | 726/26 |
| 6,636,867 | B2 | 10/2003 | Robertson | |
| 6,961,714 | B1* | 11/2005 | LeVine | 705/51 |
| 7,092,953 | B1* | 8/2006 | Haynes | 705/51 |
| 7,209,892 | B1 | 4/2007 | Galuten et al. | |
| 7,353,206 | B2 | 4/2008 | Entani | |
| 7,505,936 | B2 | 3/2009 | Huffman et al. | |
| 7,707,224 | B2 | 4/2010 | Chastagnol et al. | |
| 7,747,474 | B2 | 6/2010 | Miloslavsky et al. | |

(Continued)

FOREIGN PATENT DOCUMENTS

| | | |
|---|---|---|
| CA | 2 742 714 A1 | 5/2010 |
| DE | 10 2008 024 554 A1 | 11/2009 |

(Continued)

OTHER PUBLICATIONS

Define: territory, see Random House Dictionary definition.*

(Continued)

*Primary Examiner* — Peter Ludwig
(74) *Attorney, Agent, or Firm* — Brinks Gilson & Lione

(57) ABSTRACT

A system and method provides a customizable user-centric web portal display of data subsets associated with a client. The RARM system controls the generation and display of royalty administration and rights management (RARM) data, including royalty data and other associated data and information based on the user's rights of access, calculated royalty data metrics and other criteria. The system provides an aggregated display of a base subset of a user's royalty data and other associated data based on the user's access rights and supplemental subsets of royalty data based on whether the metrics satisfy a predetermined threshold or criteria.

20 Claims, 17 Drawing Sheets

(56) References Cited

U.S. PATENT DOCUMENTS

| | | | |
|---|---|---|---|
| 7,849,393 B1* | 12/2010 | Hendricks et al. | 715/203 |
| 8,015,615 B1 | 9/2011 | Argrawal et al. | |
| 8,117,094 B2 | 2/2012 | Multerer et al. | |
| 8,117,130 B2* | 2/2012 | Aydar et al. | 705/59 |
| 8,180,792 B2* | 5/2012 | Fanning et al. | 707/781 |
| 8,185,435 B2 | 5/2012 | Aaron et al. | |
| 8,219,494 B1 | 7/2012 | Pride et al. | |
| 8,255,812 B1 | 8/2012 | Parparita et al. | |
| 8,260,713 B2 | 9/2012 | Holcombe | |
| 8,346,585 B1* | 1/2013 | Griffith et al. | 705/7.11 |
| 2001/0047339 A1 | 11/2001 | Entani | |
| 2002/0107809 A1* | 8/2002 | Biddle et al. | 705/59 |
| 2004/0024688 A1 | 2/2004 | Bi et al. | |
| 2004/0030653 A1* | 2/2004 | Christensen | 705/51 |
| 2005/0216401 A1 | 9/2005 | Rines | |
| 2006/0136340 A1 | 6/2006 | Park | |
| 2007/0076646 A1* | 4/2007 | Foster | 370/315 |
| 2007/0083558 A1* | 4/2007 | Martinez | 707/104.1 |
| 2007/0112628 A1 | 5/2007 | Lombardo | |
| 2008/0040370 A1 | 2/2008 | Bosworth et al. | |
| 2008/0071561 A1* | 3/2008 | Holcombe | 705/1 |
| 2008/0189283 A1* | 8/2008 | Quoc et al. | 707/9 |
| 2008/0249961 A1* | 10/2008 | Harkness et al. | 705/400 |
| 2010/0057517 A1 | 3/2010 | Jerkins, Jr. et al. | |
| 2010/0146443 A1 | 6/2010 | Zuckerberg et al. | |
| 2010/0161499 A1* | 6/2010 | Holcombe et al. | 705/310 |
| 2010/0312654 A1 | 12/2010 | Parker | |
| 2011/0099096 A1 | 4/2011 | Shanley et al. | |
| 2011/0106673 A1 | 5/2011 | Shanley et al. | |
| 2012/0014321 A1 | 1/2012 | Schmitz | |
| 2012/0059700 A1* | 3/2012 | Darbyshire | 705/14.16 |
| 2012/0101948 A1* | 4/2012 | Aydar et al. | 705/59 |
| 2012/0290637 A1 | 11/2012 | Perantatos et al. | |

FOREIGN PATENT DOCUMENTS

| | | |
|---|---|---|
| EP | 1 062 605 A1 | 12/2000 |
| EP | 1 301 881 A1 | 4/2003 |
| EP | 1 754 370 A4 | 8/2009 |
| EP | 2 120 141 A1 | 11/2009 |
| EP | 2 294 539 A1 | 3/2011 |
| EP | 2 350 970 A2 | 8/2011 |
| EP | 2 417 553 A1 | 2/2012 |
| EP | 2 417 571 A1 | 2/2012 |
| EP | 2 156 386 A4 | 5/2012 |
| EP | 2 465 072 A1 | 6/2012 |
| EP | 2 550 591 | 1/2013 |
| FR | 2 814 085 A1 | 3/2002 |
| GB | 2 368 245 A | 4/2002 |
| GB | 2 477 940 A | 8/2011 |
| JP | 11-205256 | 7/1999 |
| JP | 2000-036781 | 2/2000 |
| JP | 2002-109251 | 4/2002 |
| JP | 2002-334171 | 11/2002 |
| JP | 2002-358086 | 12/2002 |
| JP | 2003-177763 | 6/2003 |
| JP | 2003-337590 | 11/2003 |
| JP | 2007-287249 | 11/2007 |
| KR | 10-2009-0061666 | 6/2009 |
| WO | WO 2000/042555 A1 | 7/2000 |
| WO | WO 02/45316 A2 | 6/2002 |
| WO | WO 2005/122571 | 12/2005 |
| WO | WO 2007/005538 A2 | 1/2007 |
| WO | WO 2007/044588 A1 | 4/2007 |
| WO | WO 2009/070724 A1 | 6/2009 |
| WO | WO 2009/143084 A1 | 11/2009 |
| WO | WO 2010/048159 A2 | 4/2010 |
| WO | WO 2010/048171 | 4/2010 |
| WO | WO 2010/117611 A1 | 10/2010 |
| WO | WO 2010/118152 A1 | 10/2010 |
| WO | WO 2011/019726 A1 | 2/2011 |
| WO | WO 2011/047326 A2 | 4/2011 |
| WO | WO 2011/086465 A1 | 7/2011 |
| WO | WO 2011/119775 A1 | 9/2011 |
| WO | WO 2012/050927 A3 | 4/2012 |
| WO | WO 2012/056326 A2 | 5/2012 |
| WO | WO 2012/064945 A3 | 5/2012 |
| WO | WO 2012/064947 A3 | 5/2012 |
| WO | WO 2012/092390 A2 | 7/2012 |
| WO | WO 2012/094415 A1 | 7/2012 |
| WO | WO 2012/094418 A1 | 7/2012 |
| WO | WO 2012/106515 A2 | 8/2012 |

OTHER PUBLICATIONS

Accenture brochure, Accenture Rights and Royalties Service Center, End-to-end solutions for intellectual property management, Accenture, copyright 2007, 4 pages.

DashBook, Royalty Software—DashBook for Book Royalties, Record Label Royalties, Publisher Royalties webpage, DashBook, printed from the internet at <http://dashbook.com/> on May 31, 2013, 2 pages.

Easy Royalties, Royalty Software webpage, Genesis Framework, Wordpress, copyright 2013, printed from the internet at <http://www.easyroyaltiesusa.com> on May 31, 2013, 2 pages.

Entomo Royalty Management, Challenges of Royalty Management and IP Protection webpage, Entomo, Inc., copyright 2013, printed from the internet at <http://www.entomo.com/channel-data-solutions/royalty-management/> on May 31, 2013, 2 pages.

Epicor Enterprise brochure, Royalties, Epicor Software Corporation, copyright 2004, 2 pages.

Facebook, Activity Feed—Facebook Developers webpage, Facebook, copyright 2013, printed from the internet at <https://developers.facebook.com/docs/reference/plugins/activity/> on Jun. 4, 2013, 2 pages.

HCL Technologies—Royalty Management webpage, HCL Technologies Limited, copyright 2013, printed from the internet at <http://hcltech.com/enterprise-application-services/oracle/royalty-management> on May 31, 2013, 2 pages.

Infosys® Royalty Management Solution brochure, Infosys® Limited, copyright 2012, 2 pages.

Intellectual Property Ledger, G3 Global webpage, GB Global, copyright 2013, printed from the internet at <http://www.g3g.com> on May 31, 2013, 3 pages.

Kobalt Brochure, Next Generation Portal User Guide Version 1, Kobalt Music Group Ltd., copyright 2009, 20 pages.

Korrect Royalty Software, Product webpage, Korrect Royalty Software, copyright 2009, printed from the internet at <http://www.korrectsw.com/KorrectProducts.html> on May 31, 2013, 2 pages.

MACCS International, RR Rights & Royalty Management—MACCS webpage, MACCS International, copyright 2013, printed from the internet at <http://www.maccs-software/maccs/rights-royalty-management/> on May 31, 2013, 4 pages.

MetaComet Systems, Manage Music & Song Royalties Accurately and Efficiently with MetaComet Royalty Tracker System web page, MetaComet Systems, copyright 2012, printed from the internet at <http://www.metacomet.com/music-royalty-software-features/> on May 31, 2013, 3 pages.

Missing Link Music, Royalty Collection—Fast, Accurate and Transparent webpage, Missing Link Music Company, copyright 2013, printed from the internet at <http://www.missinglinkmusic.com/administration-publishing-services/> on May 31, 2013, 3 pages.

Mixpanel, See the actions your customers have taken in your mobile app webpage, Mixpanel, printed from the internet at <https://mixpanel.com/activity-feed/> on Jun. 4, 2013, 3 pages.

mySAP Media, Media Industry Solution for Intellectual Property Management, SAP AG, copyright 2002, 28 pages.

NetSuite Incentive Management brochure, NetSuite, copyright 2011, 2 pages.

Oracle: Enabling Rights, Royalties and Settlement for Content Distribution, Oracle, Year, pp. 1-37.

Pirean, Universal Music Publishing Group—Royalty Portal, Security Access and Verification for RoyaltyWindow.com, Pirean Limited, copyright 2009, 2 pages.

(56) References Cited

OTHER PUBLICATIONS

PRS for Music, Disputes and Duplicate Claims webpage, PRS for Music, copyright 2013, printed from the internet at <http://www.prsformusic.com/creators/memberresources/how_it_works/disputesandduplicateclaims/pages/disputesandduplicateclaims.aspx> on May 31, 2013, 2 pages.

REAL Software Systems, REAL Software Systems—contract management & accounting for licensing deals webpage, REAL Software Systems, LLC, printed from the internet at <http;//www.realsoftwaresystems.com/> on May 31, 2013, 1 page.

RightsLogic® Content & Asset Lifecycle Management for Media, RSG Media—Rights Management, Intellectual Property Management, Business Rights Management webpage, RSG Systems, Inc., copyright 2003-2010, <printed from the internet at <http://www.rsgmedia.com/products/rightslogic-rights-magagement/rightslogic-content-and . . . > on May 31, 2013, 4 pages.

Royalty Producer webpage, Officer Solutions, copyright 1996-2013, printed from the internet at <http://www.officer.de/> on Jun. 4, 2013, 10 pages.

Symphonic Distribution, Royalties—Digital Music Distribution—Sell Your Music Online webpage, Symphonic Distribution, printed from the internet at <http://www.symphonicdistribution.com/faq/accounting/> on May 31, 2013, 6 pages.

Traction® Software, Traction Software—Connected Work webpage, Traction Software, Inc., printed from the internet at <http://traction.tractionsoftware.com/> on Jun. 4, 2013, 2 pages.

Weiss, David, "TuneSat Launches Online Portal, Enables Immediate Signup for All Music Rightsholders," SonicScoop, Oct. 9, 2011, printed from the internet at <http://www.sonicscoop.com/2011/10/09/tunesat-launches-online-portal-enables-immediate . . . > on May 31, 2013, 6 pages.

YouTube, Channel Posts—YouTube Help webpage, YouTube, LLC, copyright 2013, printed from the internet at <http://support.google.com/youtube/bin/answer.py?hl=en&answer=118693> on Jun. 4, 2013, 1 page.

* cited by examiner

CONTROL OF THE GENERATION AND DISPLAY OF ROYALTY ADMINISTRATION AND RIGHTS MANAGEMENT DATA BASED ON THE USER'S RIGHTS OF ACCESS

TECHNICAL FIELD

The present description relates generally to a system and method, generally referred to as a system, for providing a web portal customizable user-centric display of data associated with a user, and more particularly, but not exclusively, to the display of royalty administration and rights management data.

BACKGROUND

Many publishing and recording rights companies provide clients royalty administration and rights management (RARM) services. Royalty administration services may include features such as those provided by Counterpoint™, which is a software company that sells software for the management and accounting of royalties, and Royalty Share™ (owned by Google®). Current royalty administration systems and services require several months of data collection from the date and time of occurrence of earned royalty fees to the date and time the reporting of the royalties earned. Such royalty administration systems and services are problematic because of the various disparate manual and automated ways third party aggregators collect RARM information. Accordingly, royalty administration and rights management (RARM) is complex and further complicated by disparate manual and automated systems and methods used to collect and report RARM information.

SUMMARY

Various embodiments of the present invention include a system and method that, among other capabilities, provides a web portal customizable user-centric display of data subsets associated with a user. For purposes of discussion herein, this system and method are referred to generally as a royalty administration and rights management (RARM) system to control the generation and display of royalty rights management and associated account data based on the user's rights of access and data.

The RARM data may include values that satisfy (e.g., meet or exceed) one or more of a plurality of predetermined (e.g., user configurable) metrics or a plurality of predetermined (e.g., user configurable) criteria. The RARM data may, include data associated with: registration, distribution and transmission of rights owned or controlled by clients; registration, distribution and transmission of content owned or controlled by clients in physical or digital form; royalties earned due to the exploitation of rights owned or controlled by clients, usage data associated to the exploitation of rights owned or controlled by clients; new instances of use of content associated with rights owned or controlled by clients; requests for usage, adaptation or sampling of clients rights; actions required by the client in order to facilitate the administration of rights owned or controlled by clients; payments associated with the client account; changes in key details associated with the client account; data, not directly associated with usage, but relevant in indicating popularity of rights owned or controlled by clients on a global basis; information, specific or general, on the general theme of administration of rights; notifications of work and effort undertaken by system associated with rights owned or controlled by clients on a global basis.

The system comprises: a display interface; a communications interface; and a non-transitory memory coupled with a processor. The communications interface is configured to provide communications between the system and one or more third party systems. The memory may store processor executable instructions that when executed by the processor cause the processor to: retrieve data and information associated with a client from a database; generate the display interface using a set of predefined views of the data; vary the display interface based on the data, wherein the set of predefined views are selectable by an authorized user and a set of algorithmic calculations that dictate views; and display the information for the client to view based on analysis of the data and the generated display interface.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
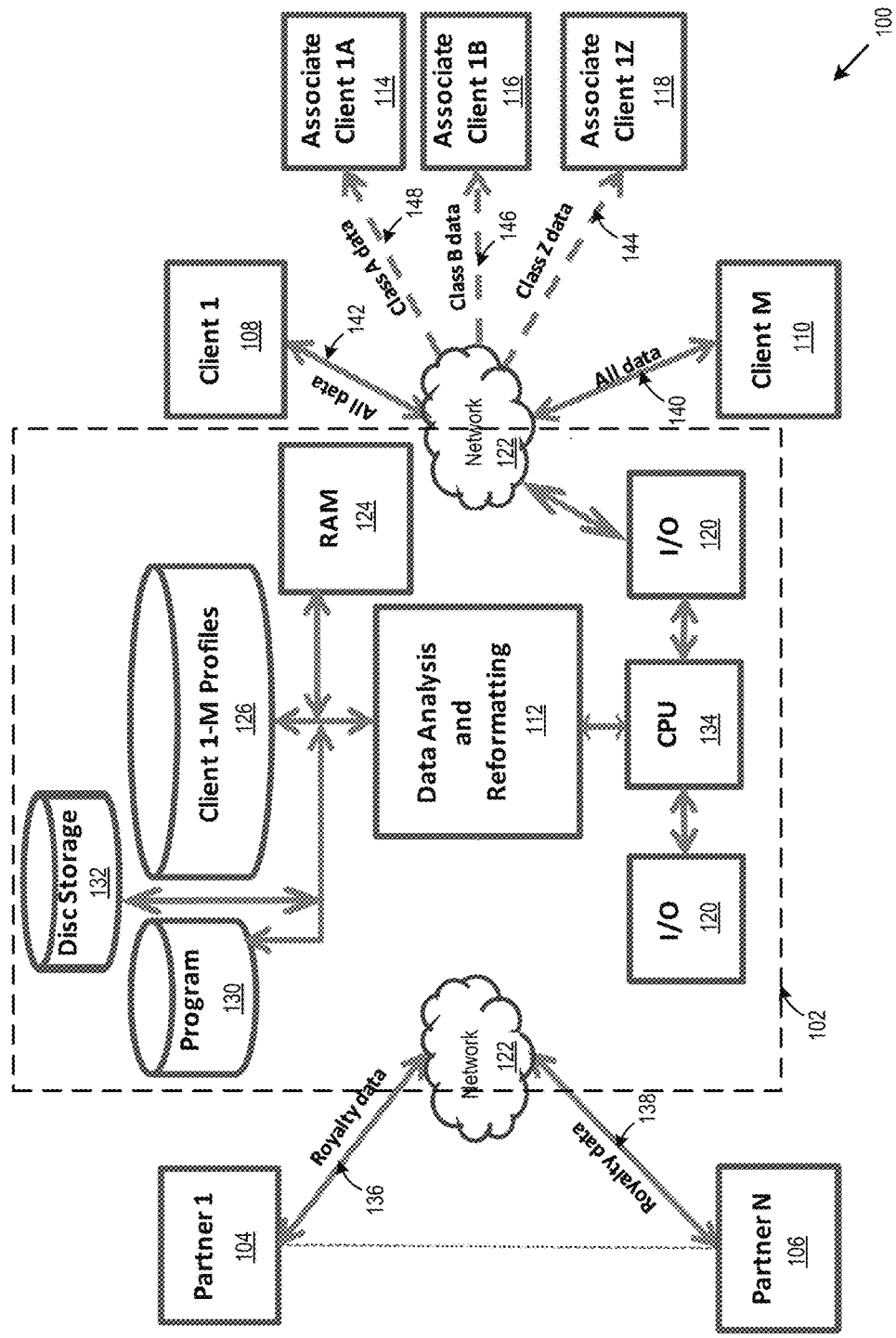
FIG. 1 is a block diagram of the royalty administration and rights management (RARM) system.

The royalty administration and rights management (RARM) system provides a tailored, interactive, web service to clients and allows the clients to view global royalty payments rights management data related to exploitation of content, account status and related information. The interface displayed to the user varies depending on the nature of the RARM data for the user (e.g., royalty payments earned, the status of the account, the status of other rights management and/or account management related data) and the class of the client or associate of the client using the RARM system, in addition to royalty payments data. For example, the RARM system may include a model based on rights management and distribution, which may be responsive to the interface display based on the right(s) assigned to and/or signed up to by the client for a certain service and a certain number of works delivered to the RARM system by the client to distribute.

The system displays the processed data to the client. The system may communicate an audible (e.g., all or a configurable portion of a song), haptic feedback (e.g., different feedback for different works and work types), visual indication or any combination thereof (e.g., communicated to the client through a smart device) that identify the royalties' allocations information by the nature of the data (e.g., by work, type of work, by territory, and/or any combination of criteria distinguishing the data) displayed to the client. The audible indication may be a user selectable audio clip, the haptic feedback may be a user selectable beat of a song or rhythm and the visual indication may be a user selectable multimedia clip (e.g., of all or a configurable portion of a work of the client) identified by the royalties' allocations information displayed to the client.

The RARM system provides a portal which may be a web based display of RARM data for a user, as well as user account information generally. The web based display may depend on the relative nature of the RARM data (e.g., the royalty data) to be displayed by the portal. The RARM system portal provides a way to view client RARM information based on the rights of the client. The rights (see also Table 1) include rights as a writer, author, and/or other generators of content or intellectual property (IP) assets to gain royalty revenue from the exploitation of their assets. The content may include analog and/or digital media supplied to a user. A user is a person, or company, that is permitted to gain access to the content. Partners collect RARM data such as royalties and other fees due to a rights holder (e.g., the client).

Partners may provide RARM data in various formats including by various means of distribution of content (e.g., physical or electronic distribution via a computer and/or processor executable instructions). The clients of the RARM system are the rights holders. An associate of the client may be a user of the RARM system, and may include an attorney or accountant. An administrator of the RARM system uses access to multiple client portals and the ability to change settings on behalf of a client. The RARM system may also provide the client the ability to change the way in which the data is presented.

Although in one implementation the RARM system assumes that the data analysis and reformatting is executed using a programmable computer, an alternative implementation may implement a non-programmable hardware solution (e.g., state machine) that may be constructed in order to carry out the same or similar functionality as the RARM system implementation. At least one advantage of the non-programmable state machine implementation is that the data analysis and reformatting may be executed more rapidly and with lower power consumption, while at least one of the disadvantages of using a state machine to conduct the operations is that the non-programmable state machine may be less flexible to modifications than the computer programmable solution.

In one embodiment, the RARM system provides clients a way to view RARM data related to exploitation of content (e.g., intellectual property in all forms, including physical and digital, now known and discovered in the future), account status and related information. The RARM system includes: a display interface; a communications interface; and a non-transitory memory coupled with a processor. The communications interface is configured to provide communications between the RARM system and one or more third party systems (e.g., collection agents such as Music Reports Inc., Rightsflow™, Harry Fox Agency™, ASCAP®, BMI®, Sound Exchange, and SeSAC™).

The memory stores processor executable instructions that when executed by the processor cause the processor to: receive RARM data (e.g., royalty data) collected and reported by the one or more third party systems; identify key parameters within the RARM data (e.g., royalty data); translate the RARM data (e.g., royalty data) into a consistent format and data structure; and allocate royalties identified by the RARM data (e.g., royalty data) to appropriate client accounts based on client criteria, including, but not limited to, client contractual agreement terms. The processor executable instructions define and re-assign access preferences associated with user credentials and access privileges of clients to view allocation data based on various one or more criteria. For example, the processor executable instructions define and re-assign access preferences based on allocated royalties and/or an unrecouped advance, so that the system may not display the 'advancing function'. The processor executable instructions perform analysis of current earnings and account status of the client based on the allocated royalties in order to obtain additional royalties allocations information for the client. The system instructions may generate a display interface through a set of predefined views of the RARM data including the allocation data collated and selectable by clients or representatives of the client, and vary the display interface based on RARM data (e.g., the royalties' allocations information and other data including the royalty payments earned), and display the RARM information for the client based on the analysis.

The processor executable instructions identify the key parameters by: analyzing a royalty; determining the type of royalty; identifying and allocating; and querying the one or more third party systems for more information when the RARM system cannot determine particular information. The RARM system determines the type of royalty including: a publishing royalty for a work; and recording royalty for a recording. The RARM system identifies and allocates: the work for a publishing royalty; the recording for a recording royalty; territory where the royalty originated; usage type; date of usage; and the client. The RARM system may query the one or more third party systems for more information when the RARM system cannot determine: the type of royalty; the work for a publishing royalty; the recording for a recording royalty; the territory, the usage type; the date of usage; the client; or any combination thereof. The processor executable instructions may analyze RARM metrics and vary the display interface based on the metrics.

The RARM metrics may include values in various formats such as percentages, ratios, discrete values that indicate results determined from the analyzed data. The RARM metrics may indicate when results are determined above or below a value, or within or outside a range of values. The RARM The metrics may include: a % of income associated with TV shows, wherein a % of income associated with TV shows that satisfies a TV shows threshold varies the display interface to include TV summary components; a % of income associated with Film shows, wherein a % of income associated with Film shows that satisfies a Film shows threshold varies the display interface to include Film summary components; a % of income associated with U.S. Radio, wherein a % of income associated with U.S. Radio that satisfies a U.S. Radio threshold varies the display interface to include U.S. Radio summary components; a number of Synchronizations, wherein a number of Synchronizations that satisfies a Synchronization threshold varies the display interface to include Synchronization summary components (e.g., zero synchronizations may prevent display of a synchronization view, or a number of synchronizations may be required to occur in order to satisfy the threshold); and a % of income associated with one or more physical products, wherein a % of income associated with one or more physical products physical product that satisfies a physical product threshold varies the display interface to include physical product summary components.

The user configurable metrics thresholds may define a range of values, or one or more discrete values above or below which the metrics are evaluated and the displays and the content of the displays may vary. The RARM metrics may also include: a % of income associated with digital income (e.g., and/or any other format of media income), wherein a % of income associated with digital income that satisfies a digital threshold (e.g., is within a range or exceeds a value) varies the display interface to include digital summary components; an amount of royalties income from products with release dates within a range of time, wherein the amount of royalties income from products with release dates that satisfy a release dates threshold varies the display interface to include historic catalogue summary components; income of client from YouTube™, wherein income of client from YouTube™ that satisfies a YouTube™ income threshold varies the display interface to include a YouTube™ summary box; or any combination thereof.

The RARM metrics may also include values that indicate the use of IP rights of clients in known and future developed technologies such 3D printing data, interactive holographic advertising and interactive holographic games. For example, the RARM metrics may identify from the 3D printing data when the IP rights of a client (e.g., such as a designer) realize royalties as a result of an individual (e.g., consumer and/or manufacturer) selecting a design for a 3D object from a menu to produce the product using a 3D printer.

The RARM metrics may further include: an unrecouped balance and advance available, where no unrecouped balance is determined to exist and an advance is available to a client varies the display interface to include advancing options, synch pitch activity (e.g., pitching a client's asset to be used with and/or to market one or more products, services, multimedia or any combination thereof). The RARM metrics may further include a number of synch pitch activities that satisfies a synchs pitched threshold that varies the display interface to include a synch pitch activity summary (e.g., how many synch pitched activities that occur over a configurable period, such as the number of pitches to synch the work of the client with the product of another occurring in the last month greater than a synchs pitched threshold then the system displays the synch pitch module). The RARM metrics may also include one or more sub-client statement obligations, wherein the existence of one or more sub-client statement obligations that satisfy a sub-client statement obligations threshold varies the display interface to include a sub client agreements summary. The RARM metrics may also identify whether at least one work was submitted during a particular period of time, so that when at least one work (e.g., a submitted works threshold) is not submitted may vary the display interface to include a warning box "No works submitted", identify a number of products submitted (e.g., zero products submitted), so that when the number of products submitted fail to satisfy a products submitted threshold (e.g., at least one product) may vary the display interface to include a warning box "No products submitted"; a number of creative pitching activities, wherein the number of creative pitching activities that satisfies a creative pitches frequency threshold (e.g., zero creative pitches or some minimum number of creative pitches) varies the display interface to include a pitch activity summary (e.g., creative pitches of a client's asset to another party for use); a frequency of exposure on current global charts is evaluated using a global charts threshold (e.g., at least one exposure on the global charts during a configurable period of time), wherein satisfying the global charts threshold varies the display interface to include a charts data summary; a terminated deal threshold, wherein the number of terminated deals that satisfies a terminated deal threshold (e.g., at least one terminated deal) varies the display interface to hide a large proportion of the portal, and display financial core data; social media metrics configured to trigger different views, wherein social media metrics that satisfy one or more social media thresholds vary the display interface to include a social media summary; or any combination thereof.

The identified key parameters within the data may include territory, usage type, or a combination thereof. The RARM system identifies the key parameters within the RARM data (e.g., royalty data), by comparing the key parameters with established codes and terms to ensure data is comparable regardless of partner data formats and data irregularities.

The RARM system varies the display interface based on the nature of royalty earned and class of the client or representative of the client using the service, as well as the RARM data, wherein the representatives of the client support the client, wherein the representatives include: accountants, lawyers, recording studios or members from neighboring industries, or any combination thereof. The RARM system generates the variations of the display interface through a set of predefined views that are selectable by a client and/or an administrator on behalf of a specific client or representative client or by a set of algorithmic calculations that dictate appropriate views based on earnings data associated with the account that may include RARM data (e.g., royalty data).

The RARM system implements a method for clients to view royalty payments related to exploitation of content, account status and related information. The method includes receiving, using a communications interface between the RARM system and one or more third party systems, RARM data (e.g., royalty data) collected and reported by the one or more third party systems; and storing, into a non-transitory memory coupled with a processor, the RARM data (e.g., royalty data), and processor executable instructions. The processor executable instructions: identify key parameters within the RARM data (e.g., royalty data); translate the RARM data (e.g., royalty data) into a consistent format and data structure; allocate royalties identified by the RARM data (e.g., royalty data) to appropriate client accounts based on client criteria, including client contractual agreement terms; define and re-assign access preferences associated with user credentials and access privileges of clients to view allocation data based on the allocated royalties; perform analysis of current earnings and account status of the client based on the allocated royalties to obtain royalties allocations information for the client; generate a display interface through a set of predefined views of the RARM data including the allocation data collated and selectable by clients or representatives of the client; vary the display interface based on the royalties allocations information including the royalty payments earned; and display the royalties allocations information for the client based on the analysis.

The method further includes: analyzing a royalty; and determining the type of royalty, including: a publishing royalty for a work; recording royalty for a recording; identifying and allocating: the work for a publishing royalty; the recording for a recording royalty; territory where the royalty originated; usage type; date of usage; and the client; querying the one or more third party systems for more information when the RARM system cannot determine: the type of royalty; the work for a publishing royalty; the recording for a recording royalty; the territory; the usage type; the date of usage; the client; or any combination thereof. The method further includes: analyzing RARM metrics; varying the display interface based on the RARM metrics. The method further includes: analyzing the RARM metrics including, but not limited to: a % of income associated with TV shows, wherein a % of income associated with TV shows that satisfies a TV shows threshold varies the display interface to include TV summary components; a % of income associated with Film shows, wherein a % of income associated with Film shows that satisfies a Film shows threshold varies the display interface to include Film summary components; a % of income associated with U.S. Radio, wherein a % of income associated with U.S. Radio that satisfies a U.S. Radio threshold varies the display interface to include U.S. Radio summary components; a number of Synchronizations, wherein the number of Synchronizations that satisfies a Synchronization threshold varies the display interface to include Synchronization summary components; a % of income associated with one or more physical products, wherein a % of income associated with one or more physical products that satisfies a physical product threshold varies the display interface to include physical product summary components; a % of income associated with digital income, wherein a % of income associated with digital that satisfies a digital threshold varies the display interface to include digital summary components; an amount of royalties income from products with release dates within a configurable range of time, wherein the amount of royalties income from products with release dates that satisfy a release dates threshold varies the display interface to include historic catalogue summary components identifying the products and corresponding rights; income of client from YouTube™, wherein income of client from YouTube™ that satisfies a YouTube™ income threshold varies the display interface to include a YouTube™ summary box; or any combination thereof.

Analyzing the RARM metrics further comprises determining: an unrecouped balance and advance available, wherein no unrecouped balance and an advance available to a client varies the display interface to include advancing options; synch pitch activity, wherein synch pitch activity that satisfies a synchs pitched threshold varies the display interface to include a synch pitch activity summary; one or more sub-client statement obligations, wherein one or more sub-client statement obligations that satisfy a sub-client statement obligations threshold varies the display interface to include a sub client agreements summary; works submitted, wherein works submitted that fail to satisfy a works submitted threshold varies the display interface to include warning box "No works submitted"; products submitted, wherein products submitted that fail to satisfy a products submitted threshold varies the display interface to include warning box "No products submitted"; creative pitching activity (e.g., whether the work of a client was creatively pitched for use), wherein creative pitching activity that satisfies a pitches frequency threshold varies the display interface to include a pitch activity summary; exposure on current global charts, wherein exposure on current global charts that satisfies a global charts threshold varies the display interface to include a charts data summary; a number of terminated deals, wherein a number of terminated deals (e.g., at least one terminated deal within a configurable period of time) that satisfies a terminated deal threshold varies the display interface to hide a proportion (e.g., large or small portion based on the number of terminated deals) of portal and display financial core data; social media metrics that could be used to trigger different views, wherein social media metrics that satisfy one or more social media thresholds vary the display interface to include a social media summary; or any combination thereof.

The identified key parameters within the data include territory, usage type, or a combination thereof. Identifying the key parameters within the RARM data (e.g., royalty data) includes comparing the key parameters with established codes and terms to ensure data is comparable regardless of partner data formats and data irregularities. The method further comprises: varying the display interface based on the nature of royalty payments earned and class of the client or representative of the client using the service, wherein the representatives of the client support the client, wherein the representatives include: accountants, lawyers, recording studios or members from neighboring industries, or any combination thereof. The method further comprising:

generating the variations of the display interface through a set of predefined views that are selectable by a client or an administrator on behalf of a specific client or representative client, or by a set of algorithmic calculations that dictate appropriate views based on earnings data associated with the client.

In an alternative embodiment, the RARM system provides a web portal customizable user-centric display of data subsets associated with a user. The RARM system may comprise: a display interface; a communications interface; and a non-transitory memory coupled with a processor, wherein the communications interface configured to provide communications between the RARM system and one or more third party systems. The memory stores: processor executable instructions that when executed by the processor cause the processor to: identify a user logged in to the web portal; determine one or more clients associated with the user, and for each user, a user profile containing a user role; retrieve RARM data (e.g., royalty data) associated with the client; prepare a predetermined base subset of the client RARM data (e.g., royalty data) according to predetermined access rights in accordance with the user role and transmitting the base subset of client RARM data for display on the web portal; identify predetermined RARM metrics and/or criteria and/or tests (e.g., whether the client is terminated) associated with the client; determine whether the client data includes any values that satisfy (e.g., exceed) any of the plurality of predetermined RARM metrics or any of the plurality of predetermined tests; and for each of the satisfied predetermined RARM metrics and/or predetermined test, preparing a subset of client RARM data (e.g., royalty data) associated with the satisfied predetermined metric for display on the web portal to supplement the base subset of client data; and customize the customizable user-centric display of data subsets based on the base subset and supplemental subset. The ratios, metrics and/or test may change over a configurable period of time. For example, the system may include a catalogue ingestion module that displays in the first period of the deal where there is a lot of activity. The, the system 102 may lower the threshold for viewing activity data (e.g., the synchronization pitches) to promote an activity the system is performing (executing) for the client (e.g., more frequently and more aggressively conduct synchronization pitches) later in the client's lifecycle relationship (subscription) with the system 102 as the term of the client's subscription approaches renewal. The client may customize the customizable user-centric display of data subsets based on the base subset and/or supplemental subset. The user roles may be reassigned to provide access to a different base subset of data associated with the reassigned user role, and for each of the satisfied predetermined RARM metrics and/or predetermined test, the user is provided access to additional functions, additional icons and additional hypertext links associated with the displayed subset of client RARM data (e.g., royalty data).

In another alternative embodiment, the RARM system implements a computer-implemented method for providing a web portal customizable user-centric display of data subsets associated with a user. The method may include identifying a user logged into the web portal; determining a client associated with the user and a user profile containing a user role; and retrieving RARM data (e.g., royalty data) associated with the client. The method may further include: preparing a predetermined base subset of the client RARM data (e.g., royalty data) according to predetermined access rights in accordance with the user role and transmitting the base subset of client RARM data (e.g., royalty data) for display on the web portal; identifying a plurality predetermined RARM metrics associated with the client; and determining whether the client RARM data (e.g., royalty data) includes any values that satisfied any of the plurality of predetermined RARM metrics.

The method may further include, for each of the satisfied predetermined RARM metrics, preparing a subset of client RARM data (e.g., royalty data) associated with the satisfied predetermined metric for display on the web portal to supplement the base subset of client RARM data (e.g., royalty data); and customizing the customizable user-centric display of data subsets based on the base subset and supplemental subset. The RARM system may provide the client the ability to program the presets of the display, and the user roles may be reassigned to provide access to a different base subset of data associated with the reassigned user role, and for each of the satisfied predetermined RARM metrics and/or predetermined tests, the user is provided access to additional functions, additional icons and additional hypertext links associated with the displayed subset of client data.

FIG. 1 is a block diagram of the royalty administration and rights management (RARM) system 102 configuration 100. Partners 1 (104) through Partner N (106) represent the commercial interest of a client 1 (108) through client M (110) (e.g., property rights owners) within a single or multiple geographic region. The commercial interests may include the status of licensing of rights and type of data usage, sale of content, the sale of access to content, revenue associated with content (such as advertising), the collection of royalty income associated with content, the gathering of royalty fees and reporting of information relating to the royalties on an ongoing basis.

The reporting from these partners may take one of many formats (e.g., a spreadsheet, PDF file, word file, electronic file or by written communications). Preferably, the partners possess computer systems (104, 106) that communicate electronically with the RARM system 102. A partner may transmit information electronically based on the Common Royalty Distribution (CRD) format. The CRD format includes details of how to interpret the different data, including for example the type of licensee, the owners and/or author(s), royalty amount, the territory, the title, usage etc. Also the format defines the order in which the data is sent to the representative of the client so that the data may be consistently ingested.

Not all partners may adopt the CRD format. Accordingly, the RARM system performs data analysis and reformatting (112) to build a unified database with common attributes. The RARM system may receive the RARM data (e.g., royalty data) with a set of instructions defining the format and the content of the file (e.g., the royalty data), for partners that have their own specific format for reporting RARM data (e.g., royalty data). The set of instructions defining the format and the content of the file (e.g., the royalty data) may be used in conjunction with information relating to the licensing agreement of the client to interpret and modify the RARM data (e.g., royalty data) from N partner. The modified RARM data (e.g., royalty data) may be stored in a uniform database, and may be further analyzed and represented to the clients (108, 110) and their associates (114, 116, 118). However, some partners may use their own format (non-CRD) and may or not provide instructions on how to ingest and interpret the data. In these cases a combination of industry knowledge and direct discussions with the partner is used to ensure correct ingestion of the data into a database (132).

In one embodiment, the RARM system 102 provides clients a way to view royalty payments related to exploitation of content under intellectual property rights agreement with the client, account status and related information. The RARM system 102 includes: a display interface (120); a communications interface (e.g., network 122); and a non-transitory memory (124, 126, 132) coupled with a processor 134. The communications interface is configured to provide communications between the RARM system 102 and one or more third party systems (104, 106). The memory (124, 126, 132) stores processor executable instructions 136 that when executed by the processor 134 cause the processor 134 to: receive RARM data (e.g., royalty data) or other information collected (136, 138) (e.g., stored in the memory 124, 126, 132) and reported by the one or more third party systems (104, 106).

In one embodiment, the RARM system 102 memory stores: processor executable instructions that when executed by the processor cause the processor to: identify a user logged in to the web portal; determine one or more clients associated with the user, and for each user, a user profile containing a user role; retrieve RARM data (e.g., royalty data) associated with the client; prepare a predetermined base subset of the client RARM data (e.g., royalty data) according to predetermined access rights in accordance with the user role and transmitting the base subset of client RARM data for display on the web portal; identify predetermined RARM metrics and/or criteria and/or tests (e.g., whether the client is terminated) associated with the client; determine whether the client data includes any values that satisfy (e.g., exceed) any of the plurality of predetermined RARM metrics or any of the plurality of predetermined tests; and for each of the satisfied predetermined RARM metrics and/or predetermined test, preparing a subset of client RARM data (e.g., royalty data) associated with the satisfied predetermined metric for display on the web portal to supplement the base subset of client data; and customize the customizable user-centric display of data subsets based on the base subset and supplemental subset.

The user configurable metrics and/or criteria and/or tests thresholds may define a range of values, or one or more discrete values above or below which the metrics are evaluated and the displays and the content of the displays may vary. The client may customize the customizable user-centric display of data subsets based on the base subset and/or supplemental subset. The user roles may be reassigned to provide access to a different base subset of data associated with the reassigned user role. For each of the satisfied predetermined RARM metrics and/or predetermined test, the user is provided access to additional functions, additional icons and additional hypertext links associated with the displayed subset of client RARM data (e.g., royalty data).

Table 1 illustrates system roles that may be used by the RARM system 102 to vary the views displayed to users.

TABLE 1

| System Roles | | | |
| --- | --- | --- | --- |
| Top Level Roles | Publishing | Recording | Neighboring Rights |
| Sub Level 1 Roles | A Writer Client; Publisher Client; Catalogue Owner Client | Artist Client; Recording Company Client; Catalogue Owner Client | Artist Client; Performer Client; Recording Company Client; Catalogue Owner Client |
| Sub Level 2 Roles | Large Medium Small | Large Medium Small | Large Medium Small |
| Sub Level 3 Roles | Accountant Lawyer Royalty administrator | Accountant Lawyer Royalty administrator | Accountant Lawyer Royalty administrator |

The processor executable instructions 130 identify key parameters within the RARM data (e.g., royalty data) (136, 138); translate the RARM data (e.g., royalty data) or other information (136, 138) into a consistent format and data structure; allocate client information identified by the RARM data (e.g., royalty data) (e.g., identified by the partner) to appropriate client accounts based on client criteria, including client contractual agreement terms; and define and re-assign access preferences associated with user credentials and access privileges of clients to view allocation data (140, 142) and subsets of the allocation data (144, 146, 148) based on the client profile or client representative's user rights. The processor executable instructions 136 perform analysis of current earnings and account status of the client based on the allocated royalties to obtain royalties allocations information for the client; generate a display interface through a set of predefined views of the RARM data including the allocation data (140, 142) and subsets of the allocation data (144, 146, 148) collated and selectable by clients or representatives of the client (114, 116, 118); vary the display interface 120 based on the royalties allocations information including the royalty payments earned; and display the royalties allocations information for the client based on the analysis.

The processor executable instructions identify the key parameters by: analyzing a royalty; determining the type of royalty; identifying and allocating royalties; and querying the one or more third party systems for more information when the RARM system cannot determine particular information. The RARM system determines the type of royalty including, but not limited to: a publishing royalty for a work; and recording royalty for a recording. The RARM system identifies and allocates: the work for a publishing royalty; the recording for a recording royalty; territory where the royalty originated; usage type; date of usage; and the client. The RARM system may query the one or more third party systems for more information when the RARM system cannot determine: the type of royalty; the work for a publishing royalty; the recording for a recording royalty; the territory, the usage type; the date of usage; the client; or any combination thereof. The processor executable instructions may analyze RARM metrics and/or predetermined tests and vary the display interface based on the RARM metrics. The RARM system interface 120 may de-format data that is received from partners 1-N (104, 106); a second interface may format client specific data to comply with Internet Protocol version 4 (IPv4) or Internet Protocol version 6

(IPv6) standards to enable transmission to a client 1-M (108, 110) (or the associates of the clients—114, 116, 118).

Figure 2:
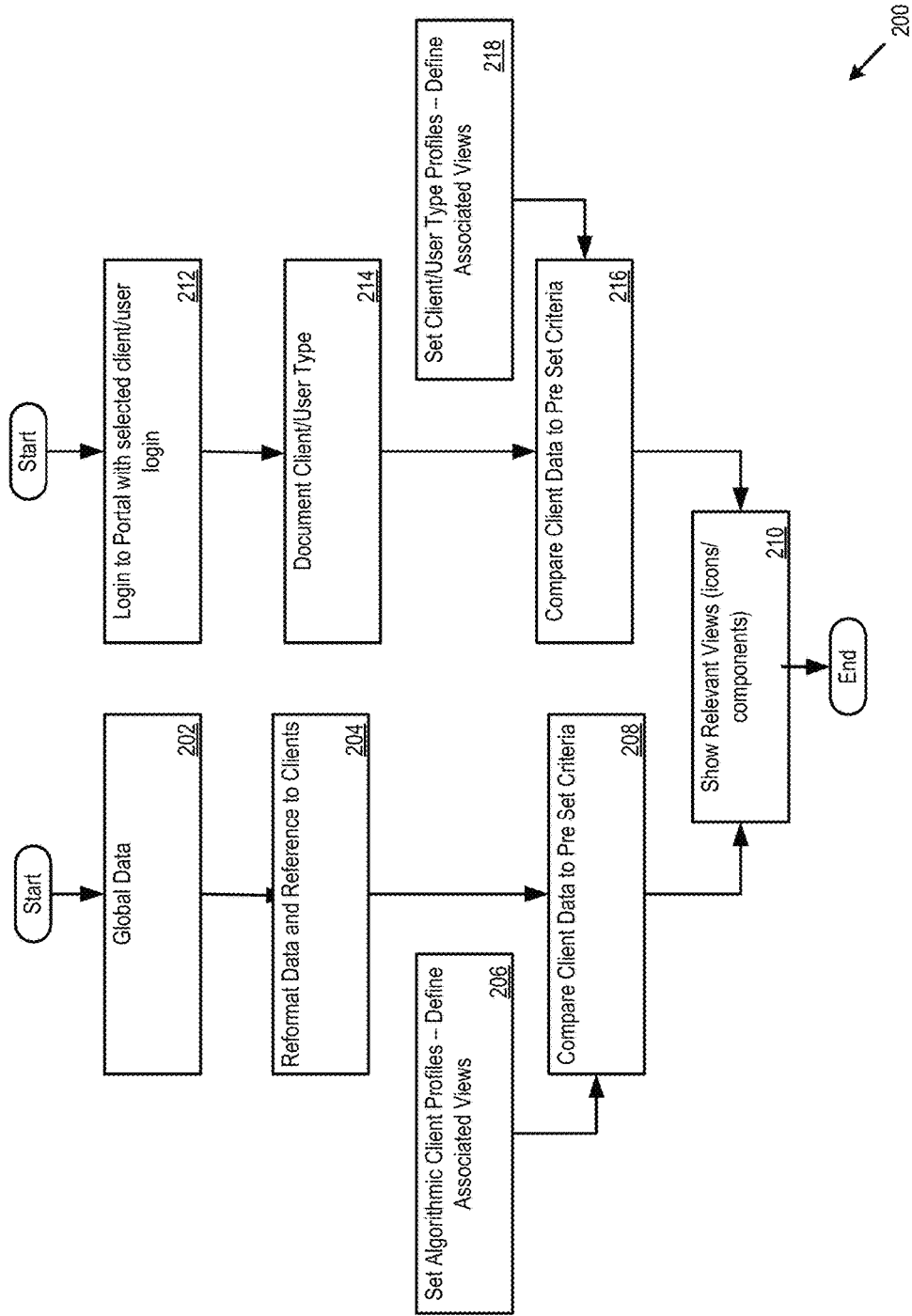
FIG. 2 is a flowchart that illustrates an embodiment of the logic instructions the RARM system may execute to control generation and display of royalty tracking data depending on the user's rights of access.

FIG. 2 is a flowchart 200 that illustrates an embodiment of the logic instructions the RARM system may execute to control generation and display of royalty tracking data depending on the user's rights of access. The RARM system receives global data (e.g., RARM data including royalty data and other client data), performs a reformat of the data as needed and identifies references to clients. The RARM system applies a set of algorithmic client profiles (e.g., algorithmic client earning profiles) to the RARM data (e.g., royalty data), defines associated views for the client and the client's representative, compares the client data to pre-set criteria (e.g., user configurable), and generates and displays relevant views (icons/components) of the RARM data (e.g., royalty data). When a user logs into the portal with a selected client/user login, the RARM system documents the client user type, uses and/or sets client/user type profiles, and defines associated views, compares client data to pre-set criteria, generates and displays relevant views (icons/components).

The RARM system receives the global data (e.g., RARM data including royalty data and other client data) from partners (1-N) and stores the global data in memory (202). The global data may contain information relating to the revenues received within a geographic region, the owners/authors of the content, the dates of use, and the territory. Global data may be transmitted using an industry known format such as the common royalty distribution (CRD) format or a partner specific format. The RARM data (e.g., royalty data) is checked, reformatted (if necessary) and referenced to specific clients (1-M) (204), stored in a standard format within the memory (e.g., a second part of the memory) prior to further calculations and referencing to the client within. The RARM system analyzes the reformatted and referenced client data to calculate a number of key ratios (e.g., metrics values) and identify key earning metrics. These ratios and metrics are then compared to a set of pre-defined algorithmic profiles (206), and the pre-defined profiles (e.g., algorithmic client profiles that define display views) are stored within a memory. The RARM system compares the reformatted global data to the predefined client profiles (208) and the RARM system forwards the data that meets the criteria to the screen formatter (210).

In addition to pre-defined algorithmic profiles (206), each client may define a separate client/User Type profile. These profiles reflect the tasks for which the users (e.g., the client and the associates or representatives of the client) are responsible. Login data is supplied by the user (212) and recorded (214) in the memory. The user login credentials are then compared (216) to a memory of client/User Type profiles (218) stored in memory. The profile, stored in a memory is utilized to categorize the type of data which the user wishes to receive. For example, a manager may wish to receive a summary of royalty earnings, while a writer may wish to receive detailed earnings together with the type of usage. In addition, the client may limit the privileges of associate clients or representatives to certain image, data and controls. The rules governing these limited privileges (218) are stored within a memory and define the types of data that are and are not made available to an associate of a client.

For example, an accountant (representative of a client) may not have access to data relating to geographic distribution of earnings. The RARM system 102 communicates to the screen formatter (210) the results from comparing client data to pre-set criteria (208) and (216) and the views that meet the algorithmic profiles (206), and client/User Type profiles (218) are communicated to the client and/or associate client.

Figure 3:
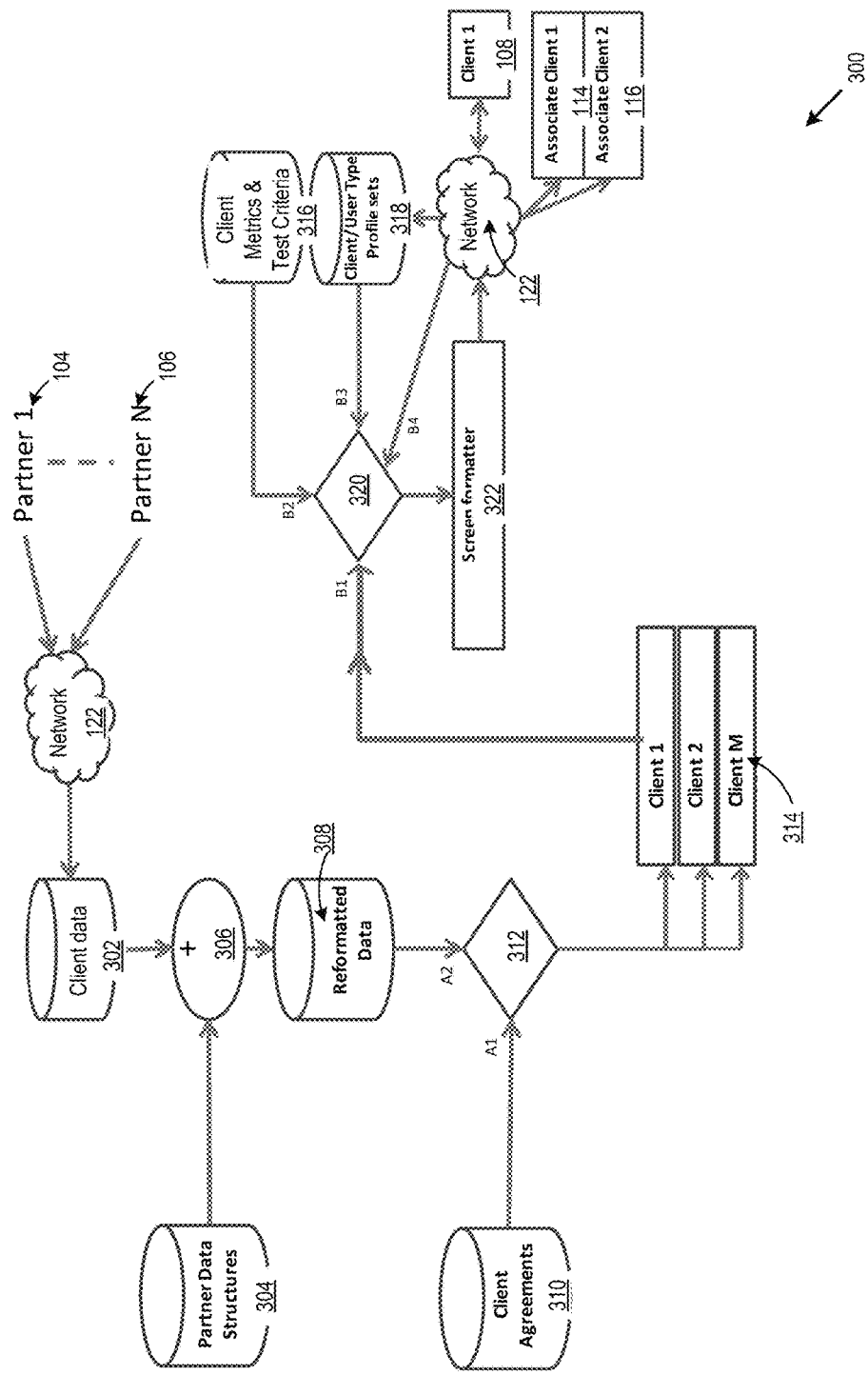
FIG. 3 illustrates another aspect of the RARM system and details of the RARM system may provide multi-roles access to data.

FIG. 3 illustrates another aspect 300 of the RARM system that the RARM system may use to provide multi-roles access to data. The multi-roles access to data may distinguish junior, senior, and accountant representatives of the clients. Client data (e.g., RARM data and other data) (302) (e.g., account and client profile information) may be communicated on a regular basis to the RARM system 102 from partners 1 to N (104, 106) and stored within memory. Historical rules governing the format of the data archived for each partner is received (304) in a memory. These archived rules are used to reformat and process the received data from the partners 1 to N (104, 106) into a standard format (306, 308) that is suitable for further processing and stored in a memory. Based on client agreements (e.g., terms, associated assets, territories covered) (310) the reformatted data is associated with a client (312). The attributes extracted from the reformatted data may include for example the type of use, the value of the royalty, the territory in which the licensing took place. The data associated with the client (314) may be stored in a memory matrix for further processing where the attributes of the client data are extracted and matched to client test criteria (e.g., earnings ratios and metrics and/or tests) (316). Login credentials of the user are obtained and compared with client/user type profiles (318). Based on the attributes determined by analyzing the extracted attributes of the client RARM data (e.g., royalty data) (320) and the attributes set by the client 108, selected information is sent to the client 108 (or associate clients (113, 116)). The information used to construct views of data subsets and displayed by the screen formatter (322) depends on the results of the analysis governed by the client's earnings metric rules and account tests (316).

Figure 4:
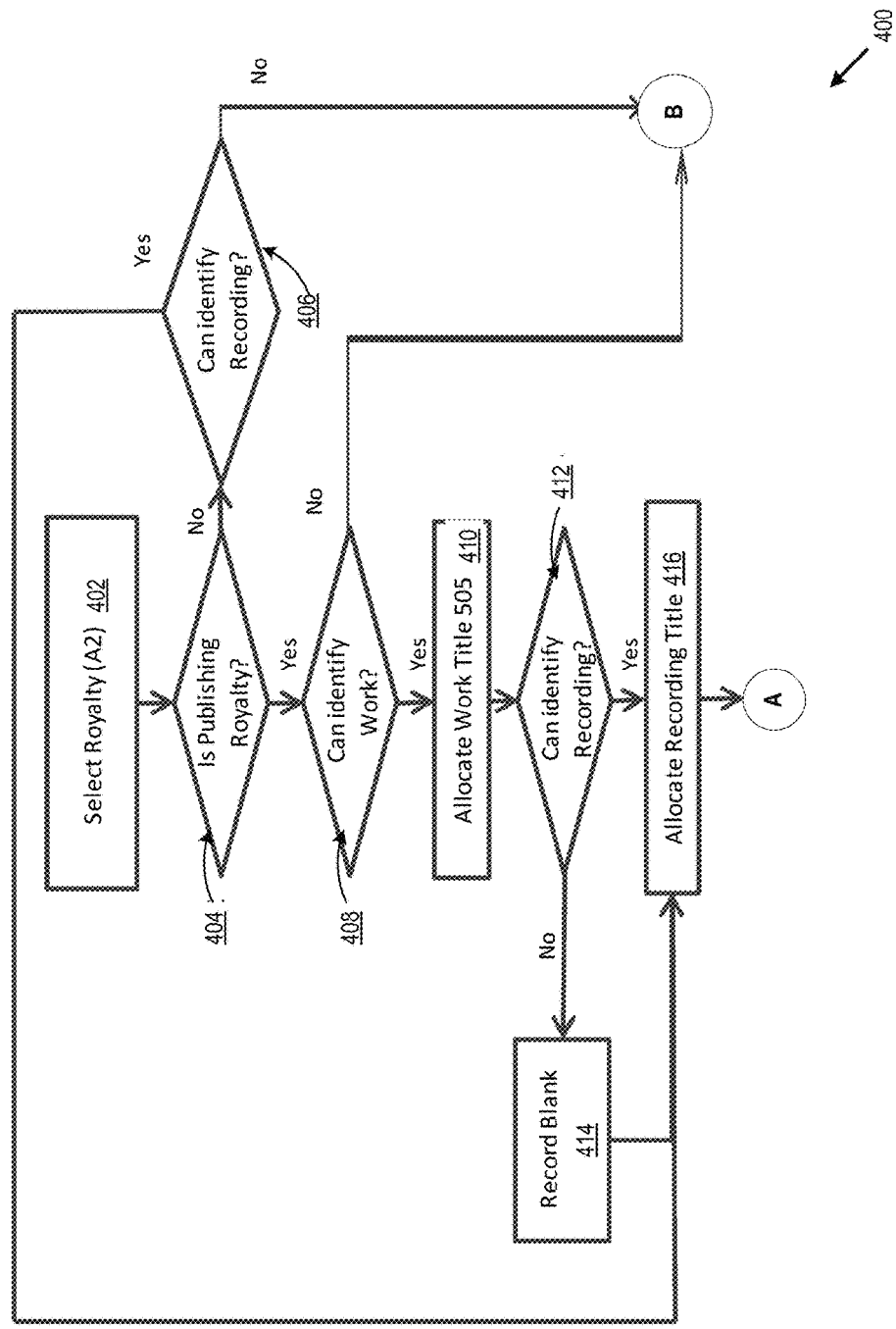
FIG. 4 is a flowchart that illustrates an embodiment of the logic instructions the RARM system may execute to associate royalties with clients.

FIG. 4 illustrates a flowchart 400 that illustrates an embodiment of the logic instructions the RARM system may execute to associate royalties with clients, the type of use and the territory of use, as well as date and time of use. The type of use and the territory of use may identify intellectual property rights to terms, songs, works and territories. For example, where the royalty income is greater than some threshold value (e.g., a dollar amount or a percentage of the total royalties for that specific client) the film royalties show Film box. The information shown to a user is dependent on the user classification. For example, a junior staff member of the client may not receive access to financial information.

Each piece of reformatted RARM data (e.g., royalty data) contains some (e.g., all, or a portion) of the RARM data (e.g., royalty data) and may include the following attributes: royalty amount; asset title; territory (e.g. geographic region or country); type of usage (e.g. film, TV, radio, digital download); date of usage; and names of clients. The RARM system 102, via a sequence of interrogations of each of the pieces of reformatted RARM data (e.g., royalty data) (steps 402-416, 504-518, 602-616), determines, labels and allocates the attributes associated with each royalty amount to a client 1 through M. Each labeled royalty amount associated with a client is subsequently checked against the recorded contractual agreement for that client. Valid, labeled royalty licensing data may be stored in a memory within a matrix associated with the clients.

The RARM system 102 analyzes the RARM data (e.g., royalty data) (402) to determine whether the RARM data (e.g., royalty data) identifies a publishing royalty (404), and if not, to determine whether the RARM data (e.g., royalty data) identifies a recording (406) or work (408). The RARM system 102 allocates a work title (410) and recording title (416) for identified works. If no publishing royalty, recording royalty or work royalty is identified (406, 412) the RARM system 102 may communicate a request for more information (502), as shown in FIG. 5.

Figure 5:
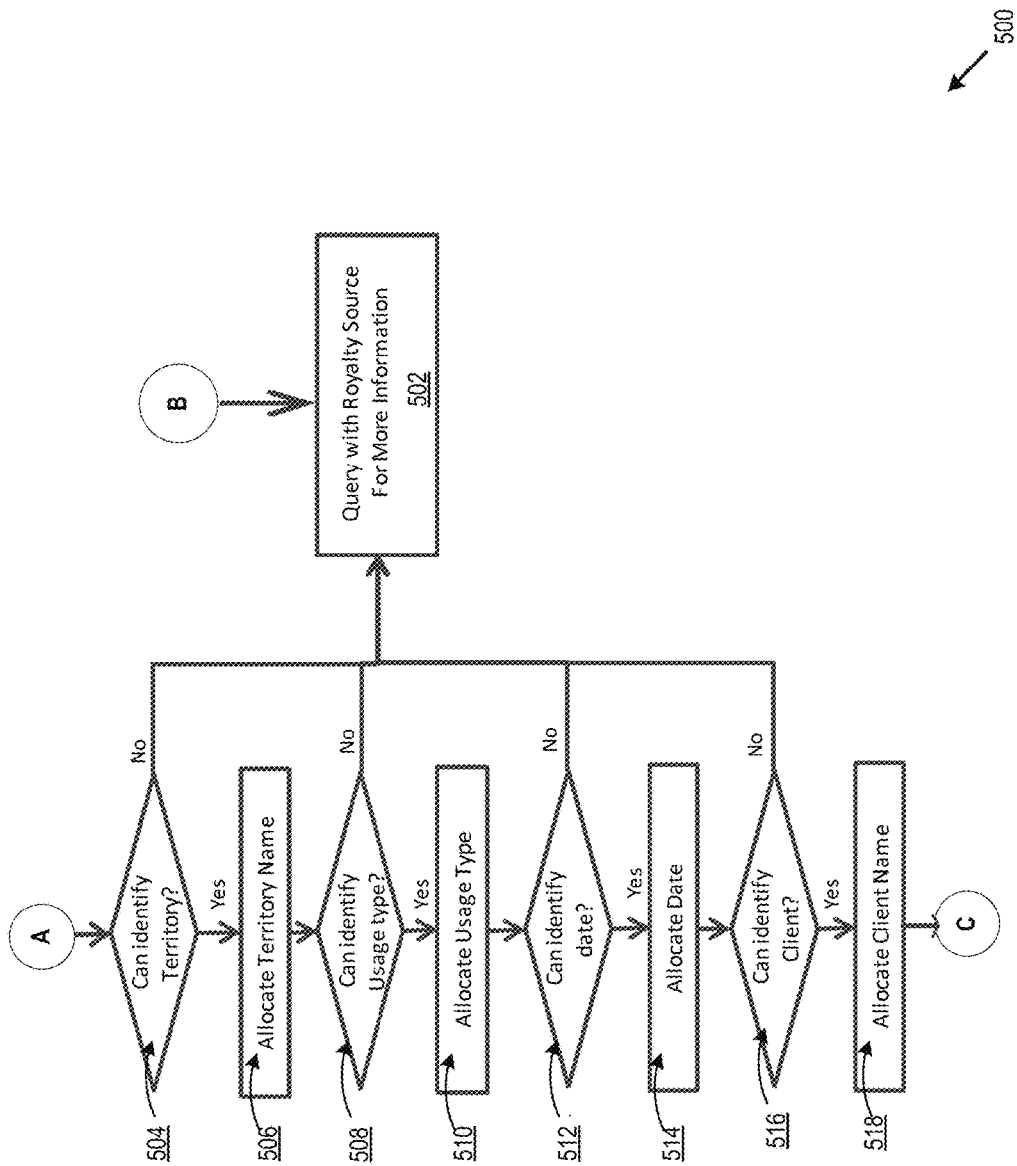
FIG. 5 is a continuation of the flowchart of FIG. 4 that illustrates an embodiment of the logic instructions the RARM system may execute to associate royalties with clients.

FIG. 5 illustrates a continuation of the flowchart 500 of an embodiment of the logic instructions the RARM system may execute to associate royalties with clients. The RARM system 102 analyzes the RARM data (e.g., royalty data) (402) to determine whether the RARM data (e.g., royalty data) identifies items such as a territory of usage (504, 506), usage type (508, 510), date of usage (512, 514), client owner of royalty (516, 518). If no territory of usage, usage type, date of usage or client owner is identified (406, 412) the RARM system 102 may communicate a request for more information (502) to the partners (104, 106).

The processor executable instructions identify the key parameters by: analyzing the royalty; determining the type of royalty; identifying and allocating; and querying the one or more third party systems for more information when the RARM system cannot determine particular information. The RARM system determines the type of royalty including, but not limited to: a publishing royalty for a work; and recording royalty for a recording. The RARM system identifies and allocates: the work for a publishing royalty; the recording for a recording royalty; territory where the royalty originated; usage type; date of usage; and the client. The RARM system queries the one or more third party systems for more information when the RARM system cannot determine: the type of royalty; the work for a publishing royalty; the recording for a recording royalty; the territory, the usage type; the date of usage; the client; or any combination thereof. The processor executable instructions may analyze metrics and vary the display interface based on the royalty-based metrics.

Figure 6:
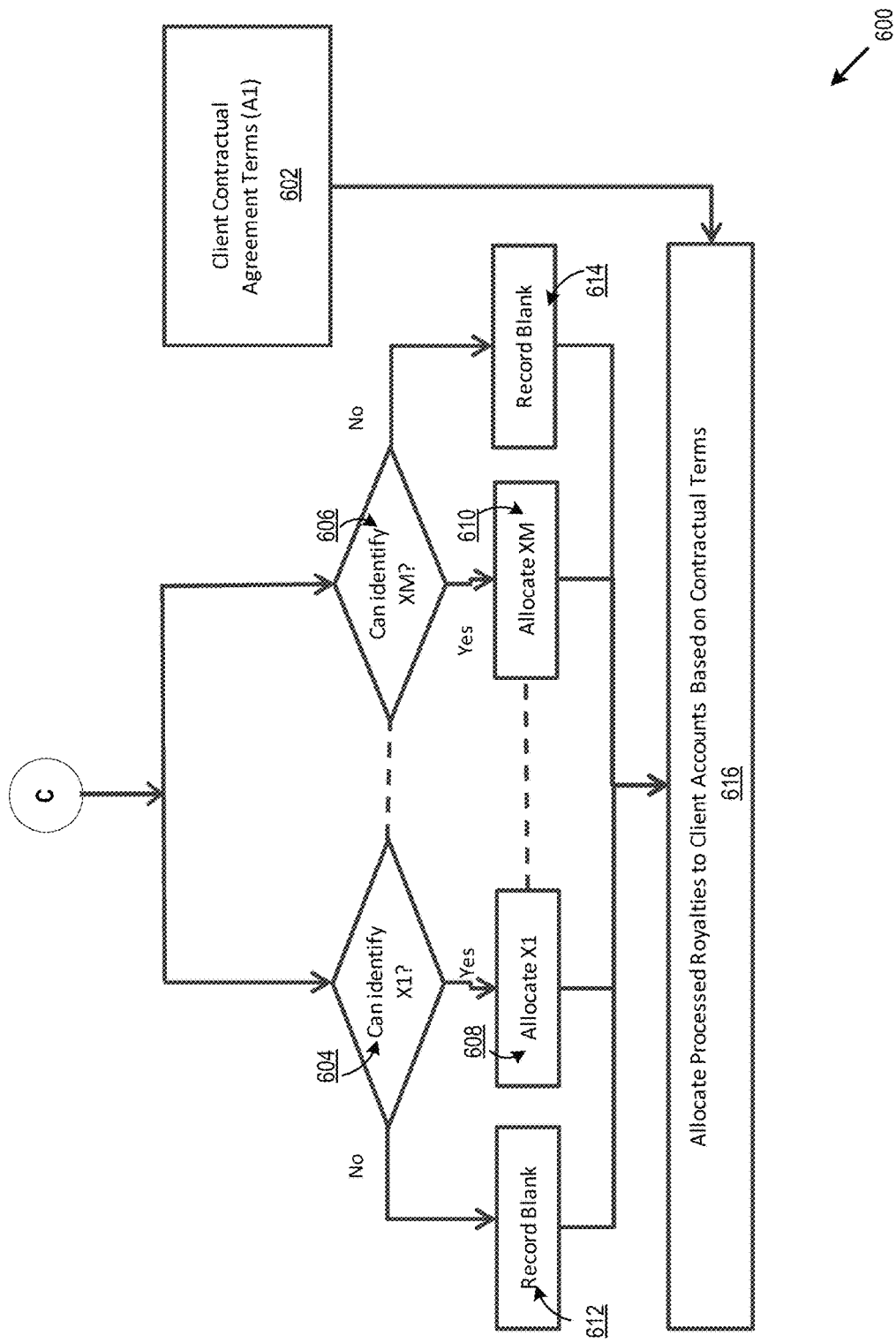
FIG. 6 is a continuation of the flowchart of FIG. 5 that illustrates an embodiment of the logic instructions the RARM system may execute to allocate processed royalties to the accounts of the clients based on the client's contractual terms.

FIG. 6 is a flowchart 600 that illustrates an embodiment of the logic instructions the RARM system may execute to allocate processed royalties to the accounts of the clients based on the client's contractual terms (602). The RARM system 102 analyzes the RARM data (e.g., royalty data) (402) to determine whether the RARM data (e.g., royalty data) identifies any number of additional royalty allocation attributes (X1 through XM) (604, 606), and allocates RARM data (e.g., royalty data) as appropriate (608, 610) or record blank (612, 614). The RARM system 102 allocates processed royalties to client accounts based on contractual terms (602, 616).

Figure 7:
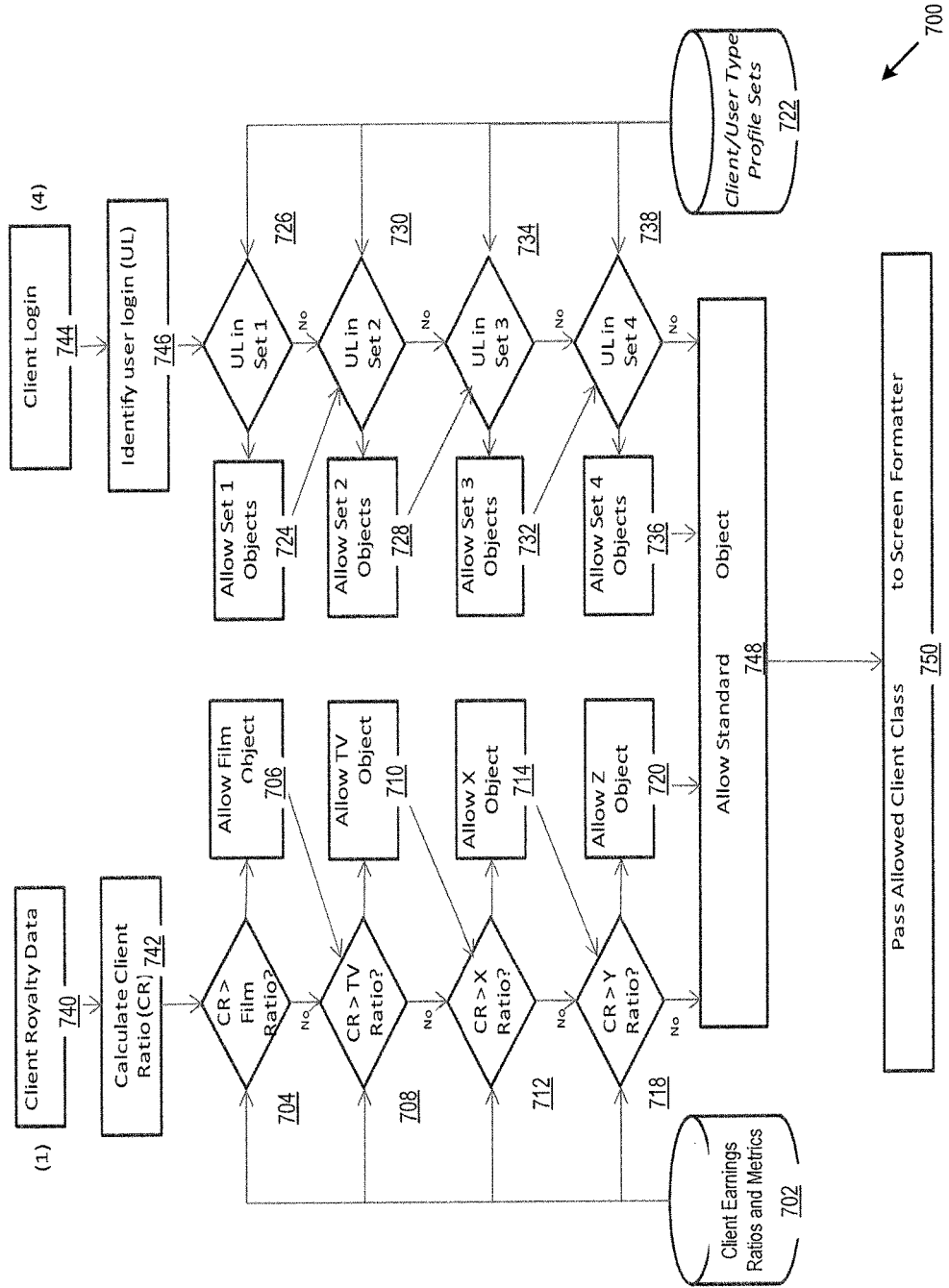
FIG. 7 is a flowchart that illustrates an embodiment of the logic instructions the RARM system may execute to determine the client objects to communicate to a screen formatter of the RARM system.

FIG. 7 is a flowchart 700 that illustrates an embodiment of the logic instructions the RARM system may execute to determine the client objects to communicate to a screen formatter of the RARM system. The RARM system obtains validated RARM data (e.g., royalty data) associated with a client 1 from the memory matrix and compared to a preset level of ratios (or criteria) (702) (e.g., client earning ratios and metrics) stored within a memory. If the validated RARM data (e.g., royalty data) satisfies (e.g., exceeds) a certain ratio or meets a certain criteria the visual display of data associated with the ratio or criteria may be allowed to be viewed. For example, a royalty trigger point of 10% could be set for royalties associated with film usage. If client 1 earnings identified as film expressed as a % of total client 1 royalties satisfies (e.g., exceed) the earnings ratio then the visual display, objects and data sources associated with films are enabled for the client 1. If subsequent earnings ratios are also satisfied (e.g., exceeded) and/or criteria met, the associated display objects/data are also enabled for client 1. Thus, the type of display objects and/or data sources presented to the client 1 are set by comparing (e.g., sequentially) the RARM data (e.g., royalty data) to the client earnings ratios and criteria (704 through 720) and enabling display objects where the earnings ratios are satisfied (e.g., exceeded) and/or criteria met.

Based on the categorization of the user when compared to a profile (722) preset by client 1, the display objects and data supplied to a specific client or associate client are masked or alternatively functions are disabled. Those display objects and data that meet the condition set by the client are enabled and/or displayed for the client or associate client. The client may specify different views for different associate clients as well as specify the client's own view, and/or have both client and associate client view specified by an administrator. The categorization of a user, after login (744) and identifying the user (746), is determined using a sequence of comparisons to the present conditions (724 through 738).

For example, a client or associate of a client gains access to information displayed for classes of clients and types of data, after log in and validation. The screen contains electronic buttons that are either enabled or disabled depending on the Client/User Type rules (722) governing the person logged in. Disabled buttons are set in advance to prevent a logged in person of a corresponding predefined set of Client/User Type rules (722) from accessing certain subsequent screens and/or data. These screens and/or data correspond to the appropriate classification of royalty types determined by the interrogation of RARM data (e.g., royalty data) (740) by the class identifying analysis (704 through 720).

Another example of display and functions enabled for film class royalties. The information allowed to be constructed and displayed by the Screen Formatter (322) depends on the results of the royalty class identifying analysis (704 through 720) governed by the clients earnings ratios and metrics rules and/or test criteria (702). Thus, the display seen by the client or associate client varies depending on the characteristics of the royalty type reported for that client at that point in time (748, 750).

The metrics may include: a % of income associated with TV shows, wherein a % of income associated with TV shows that satisfies a TV shows threshold varies the display interface to include TV summary components; a % of income associated with Film shows, wherein a % of income associated with Film shows that satisfies a Film shows threshold varies the display interface to include Film summary components; a % of income associated with U.S. Radio, wherein a % of income associated with U.S. Radio that satisfies a U.S. Radio threshold varies the display interface to include U.S. Radio summary components; a number of Synchronizations, wherein a number of Synchronizations that satisfies a Synchronization threshold varies the display interface to include Synchronization summary components (e.g., zero synchronizations may prevent display of a synchronization view, or a number of synchronizations may be required to occur in order to satisfy the threshold); a % of income associated with one or more physical products, wherein a % of income associated with one or more physical products physical product that satisfies a physical product threshold varies the display interface to include physical product summary components; a % of income associated with digital income, wherein a % of income associated with digital that satisfies a digital threshold varies the display interface to include digital summary components; an amount of royalties income from products with release dates within a range of time, wherein the amount of royalties income from products with release dates that satisfy a release dates threshold varies the display interface to include historic catalogue summary components; income of client from YouTube™, wherein income of client from YouTube™ that satisfies a YouTube™ income threshold varies the display interface to include a YouTube™ summary box; or any combination thereof.

The metrics and/or criteria may further include: an unrecouped balance and advance available, where no unrecouped balance is determined to exist and an advance is available to a client varies the display interface to include advancing options; synch pitch activity. The metrics further include synch pitch activity (e.g., the number of times a pitch was made to use the work of the client to market another product) that satisfies a synchs pitched threshold varies the display interface to include a synch pitch activity summary; one or more sub-client statement obligations, wherein one or more sub-client statement obligations that satisfy a sub-client statement obligations threshold varies the display interface to include a sub client agreements summary; works submitted, wherein works submitted that fail to satisfy a works submitted threshold varies the display interface to include warning box "No works submitted"; products submitted, wherein products submitted that fail to satisfy a products submitted threshold varies the display interface to include warning box "No products submitted"; creative pitching activity, wherein creative pitching activity that satisfies a creative pitch frequency threshold varies the display interface to include a pitch activity summary; exposure on current global charts, wherein exposure on current global charts that satisfies a global charts threshold varies the display interface to include a charts data summary; a terminated deal, wherein a terminated deal that satisfies a terminated deal threshold varies the display interface to hide a large proportion of the portal, and display financial core data; social media metrics that may be used to trigger different views, wherein social media metrics that satisfy one or more social media thresholds vary the display interface to include a social media summary; or any combination thereof.

Figure 8:
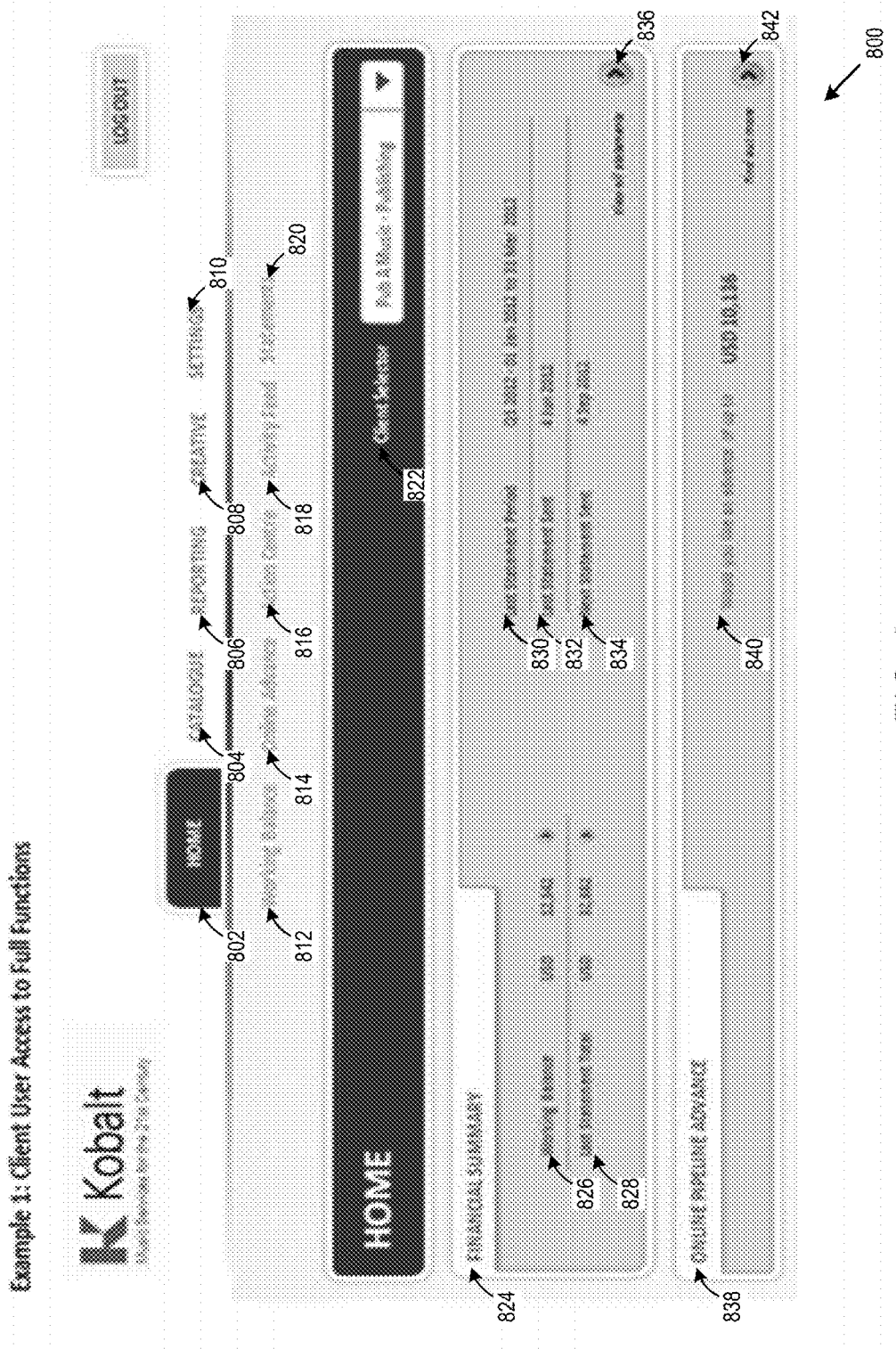
FIG. 8 is a display of an embodiment of the RARM system that illustrates functions accessible by the client user.

FIG. 8 is an embodiment of a display 800 of the RARM system that illustrates functions accessible by the client user. The RARM system 102 varies the display interface based on the RARM data including the nature of royalty payments earned and class of the client and/or representative of the client using the service, wherein representatives of the client support the client, wherein the representatives include: accountants, lawyers, recording studios or members from neighboring industries, or any combination thereof. The RARM system generates the variations of the display interface through a set of predefined views that are selectable by a client and/or an administrator on behalf of a client and/or representative client and/or by a set of algorithmic calculations that dictate appropriate views based on RARM data associated with the account.

The RARM system display interface for a client user with full access to functionality may display user selectable view options, including, but not limited to: home 802, catalogue 804, reporting 806, creative 808, and settings 810. The client user may select the user selectable view options, including, but not limited to: the working balance 812, online 'advance(s)' 814, action centre 816, activity feed 818 and statements 820. The home 802 view may be refined by the client selector 822 that identifies a publisher (e.g., royalty fee collector) displaying the financial summary 824 information for a client including, but not limited to: the working balance 826, last statement total 828, last statement period 830 (start and end date and time), last statement sent date 832, and next statement date sent 834. The user client may view all their statements 836. The home 802 view may include the "online pipeline advance" 838 information and option to redeem all or some portion of an advance 840 and/or the option for more information 842.

Figure 9:
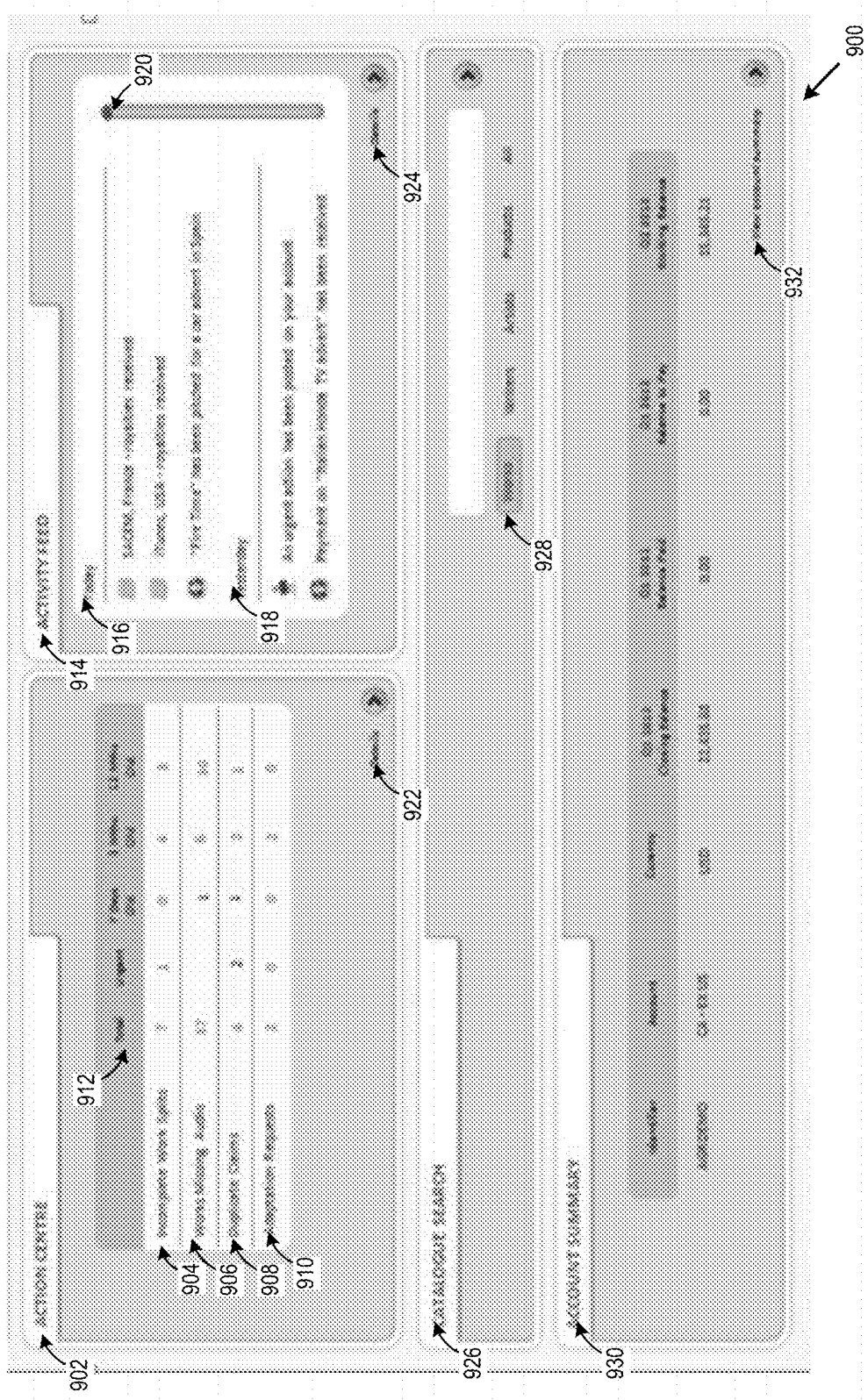
FIG. 9 is a continuation display of the FIG. 8 display of an embodiment of the RARM system that illustrates functions accessible by the client user.

FIG. 9 is a continuation display 900 of the FIG. 8 display 800 of an embodiment of the display 900 of the RARM system that illustrates functions accessible by the client user. The RARM system may display action centre information 902 that displays actions that require an action by the client, including, but not limited to, incomplete work splits 904, works missing audio 906, duplicate claim 908 and adaptation requests 910, and the age of the action request 912. The RARM system may display activity feed 914 information of various royalty source communications of RARM data (e.g., royalty data), including current (e.g., today activity 916) and past (e.g., yesterday activity 918) using a slide bar 920. Detail and summary views may be available by toggling the details (922, 924) options for the action centre and activity feed. The RARM system may provide the user the ability to search the catalogue 926 by catalogue search attributes 928 including, but not limited to, works, writers, artists, products or combination of the attributes. The RARM system may display the account summary 930 information and provide the ability to view detail and summary account 932 information.

Figure 10:
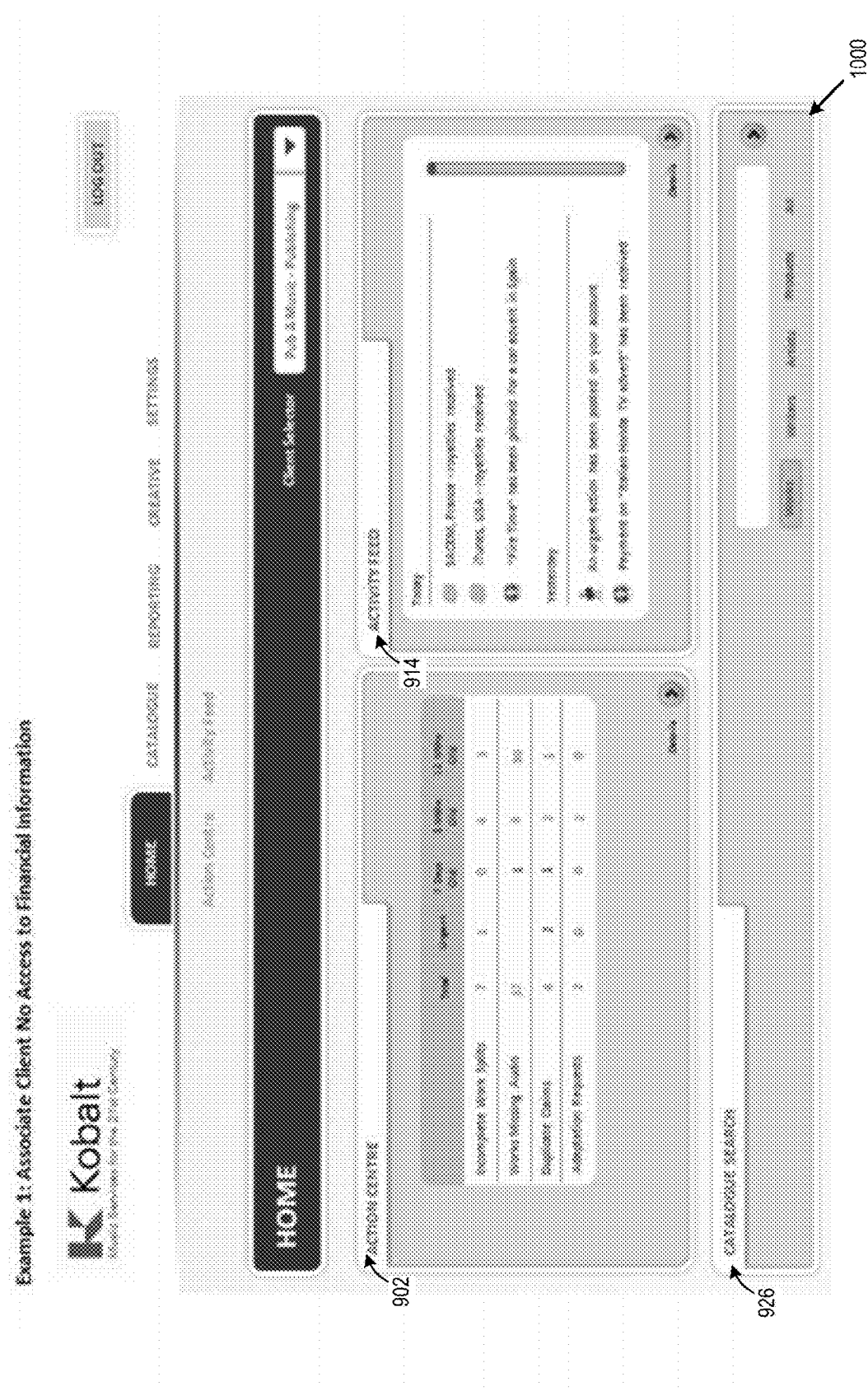
FIG. 10 is a display of an embodiment of the RARM system that illustrates no financial data is accessible by the associate of the client.

FIG. 10 is an embodiment of a display 1000 of the RARM system that illustrates no financial data is accessible by the associate of the client. The associate of the client may view the action centre 902 information, activity feed 914 information and the ability to perform a catalogue search 926 without providing the financial information.

Figure 11:
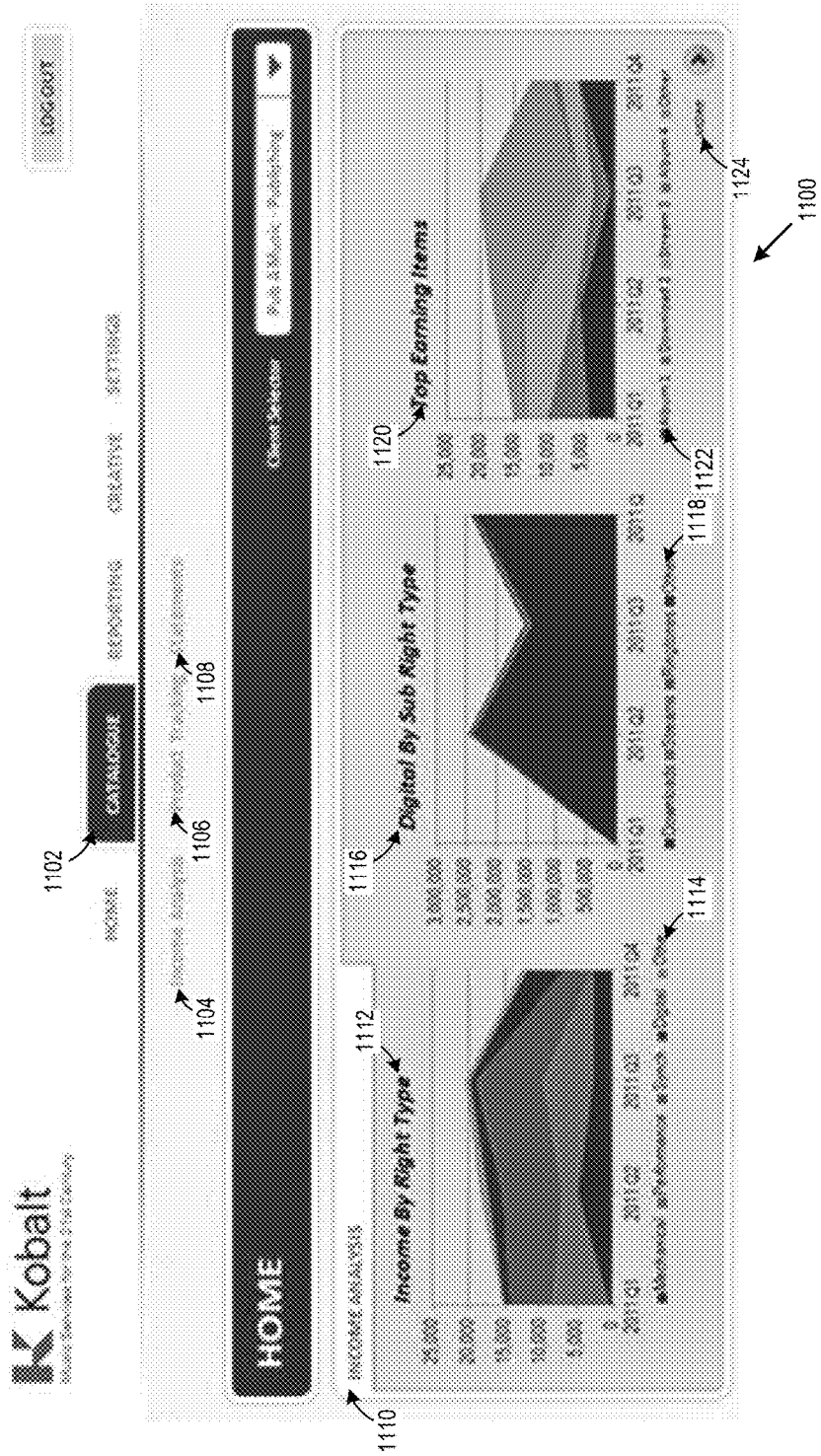
FIG. 11 is a display of an embodiment of the RARM system that illustrates functions accessible by the client user and client earnings information that meet an "album product" earnings ratio.

FIG. 11 is an embodiment of a display 1100 of the RARM system that illustrates functions accessible by the client user, and client earnings information that meets an "album product" earnings ratio. Under the 'catalogue' option 1102, the RARM system may provide the client user selectable views options including, but not limited to, an income analysis 1104, product tracking 1106, and statements 1108 views options. The income analysis 1110 view may include 'income by right type' 1112 identified by different right types 1114 (e.g., mechanical, performance, synchronization, digital, and other), 'digital by sub right type' 1116 identified by different digital sub right types 1118 (e.g., downloads, streams, ringtones, and other), and/or 'top earning item' 1120 (e.g., royalty rights) identified by different rights 1122 (e.g., album1, download2, stream3, album 4, and other). The income analysis 1110 view may provide the option to view more detail or less detail 1124.

Figure 12:
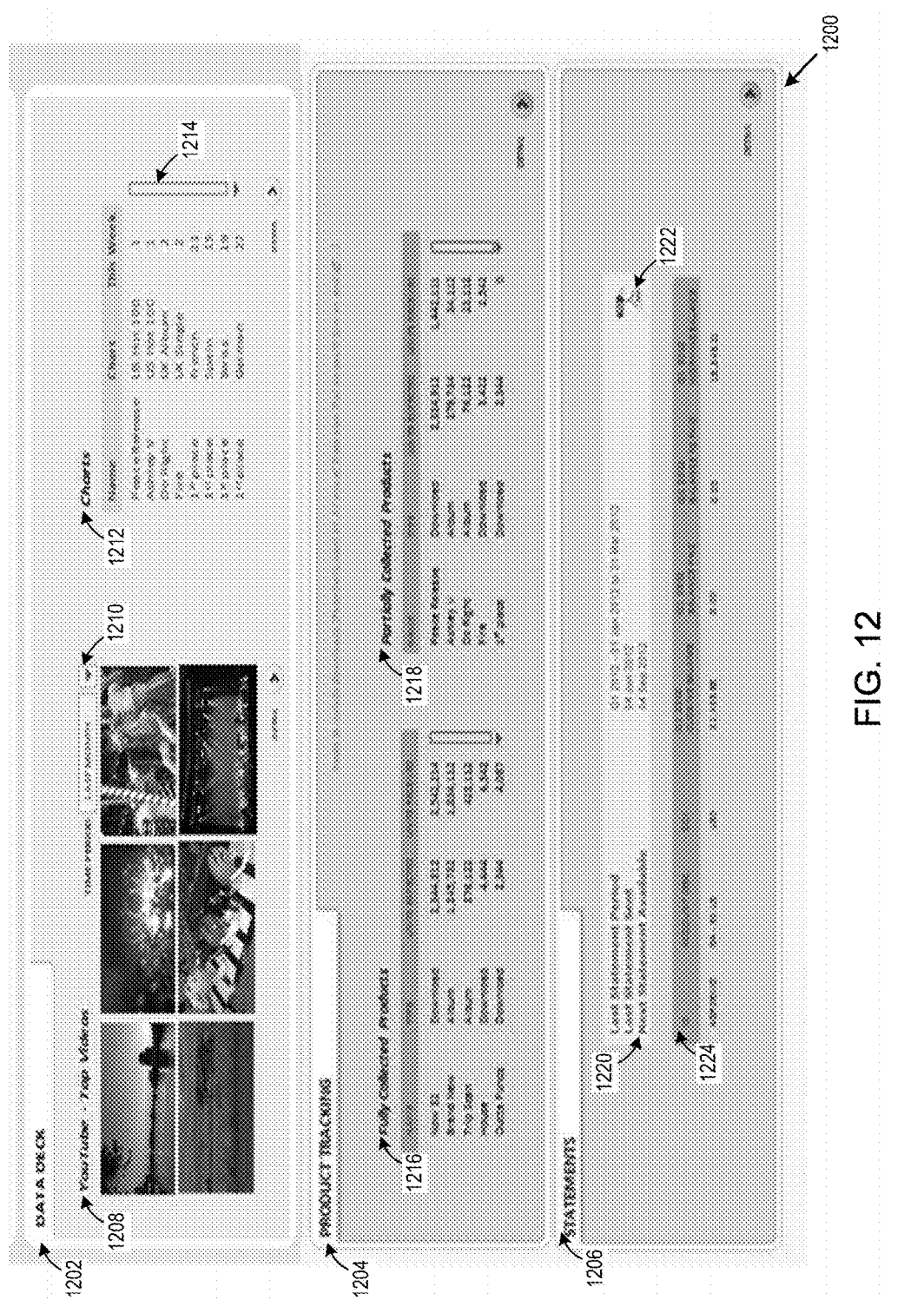
FIG. 12 is a continuation display of FIG. 11 display of an embodiment of the RARM system that illustrates functions accessible by the client user and client earnings information that meet an "album product" earnings ratio.

FIG. 12 is a continuation display 1200 of the FIG. 11 display 1100 of the RARM system that illustrates functions accessible by the client user and client earnings information that meets an "album product" earnings ratio and/or film earnings ratio. The RARM system may provide the client user a data deck view 1202, product tracking information 1204, and statements 1206. The data deck view 1202 may provide the client user the ability to view the multimedia asset 1208 (e.g., royalty right) for a selectable time period 1210, and various charts 1212 for various selectable time periods using the time slide bar 1214. The product tracking 1204 information may include fully collected products 1216 and partially collected products 1218. The statements 1206 information may include a list of statements for different time periods 1220 available for download, viewing or email delivery in different formats (PDF) 1222 and provide detail description of the content of each statement 1224.

Figure 13:
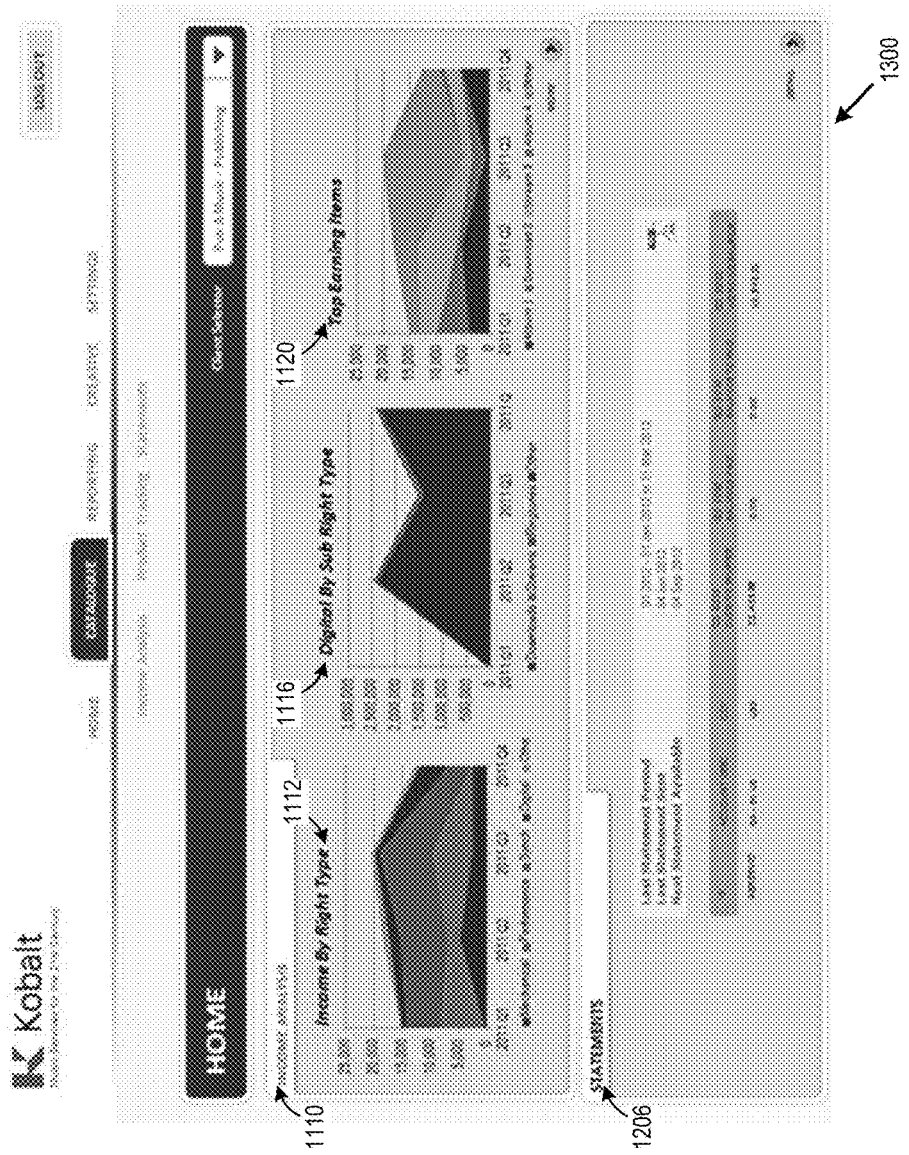
FIG. 13 is a display of an embodiment of the RARM system that illustrates functions accessible by the client user absent client earnings information when the client earnings do not meet an "album product" earnings ratio.

FIG. 13 is an embodiment of a display 1300 of the RARM system that illustrates functions accessible by the client user absent client earnings information when the client earnings do not meet an "album product" earnings ratio. Notice the display 1300 does not display either a data deck 1202 or product tracking 1204 view as shown at FIG. 12, because of the absence of client earnings information when the client earnings do not meet an "album product" earnings ratio.

The RARM system 102 provisions web based tracking of royalties and associated account information via a programmable, modular, graphic user interface collated using an assignable information tree that relates to categories of ongoing activities and user types. The RARM system 102 performs an ingestion of RARM data (e.g., royalty data) collected and reported by a worldwide network of partners, the identification of key parameters and the allocation of royalties to appropriate client accounts. The RARM system 102 translates data received from Partners into a consistent format and data structure; and identifies key parameters within the data (e.g., such as territory or usage type) against established codes and terms to ensure data is comparable regardless of partner data formats and irregularities. For example, partner A may mark royalties from the country Italy with the full name "Italy" whereas partner B may mark royalties from Italy by the code "IT". The RARM system 102 may further allocate royalties to the appropriate client account, and construct the data collated into views and made available to clients and/or their associate clients based on client configurable criteria. The views may be generated through a set of predefined views that are selectable by a client or an administrator on behalf of a specific client or associate client, and/or by a set of algorithmic calculations that dictate appropriate views based on earnings data.

The RARM system translates the RARM data (e.g., royalty data) from partners into a consistent format and data structure that facilitates and/or governs clients ability to provision in order to define, and re-assign, access preferences associated with their user credentials as well as define and re-assign access privileges of clients and/or associates of clients to view specific data. For example, associates of clients may include associates that support the client such as accountants, lawyers, recording studios and/or members from neighboring industries. The definition and re-assignment of different privileges of an associate of a client by a client may trigger the masking (or enabling) of access to different screens, different functions, different icons or different hypertext links within the screens, and thus, different elements of instructions and system components and logic may be associated with different user rights. The client may assign different rights of access to different associates of the clients.

For example, with the assignment of financial information the client may wish to mask certain information from certain classes of associates of clients, while for recording or contractual information the client may wish to provide full visibility to associates of clients. Therefore, the RARM system masks (or unmasks) specific functionality and/or data based on the client's classification of the needs of associates of the clients.

Identification of key parameters within the data (such as territory or usage type) against established codes and terms to ensure all data is comparable regardless of partner data formats and irregularities governs the ability of the RARM system to perform an automated analysis of the client's current earnings and account status and show information relevant to the client based on this analysis. The outcome of the automated, analysis triggers the masking (or enabling) of access to different screens, different functions, different icons or different hypertext links within the screens and thus different elements of software associated with different rights.

For example, based on an automated analysis of client earnings the system may determine that the client has a significant interest in a certain territorial market. Once this factor has been identified the system may automatically display to the client a set of targeted views that provide more detailed information related to this territorial market. The system displays data to users using theses targeted views in this way including but not limited to royalty earning summaries, product collection summaries, and industry news.

Figure 14:
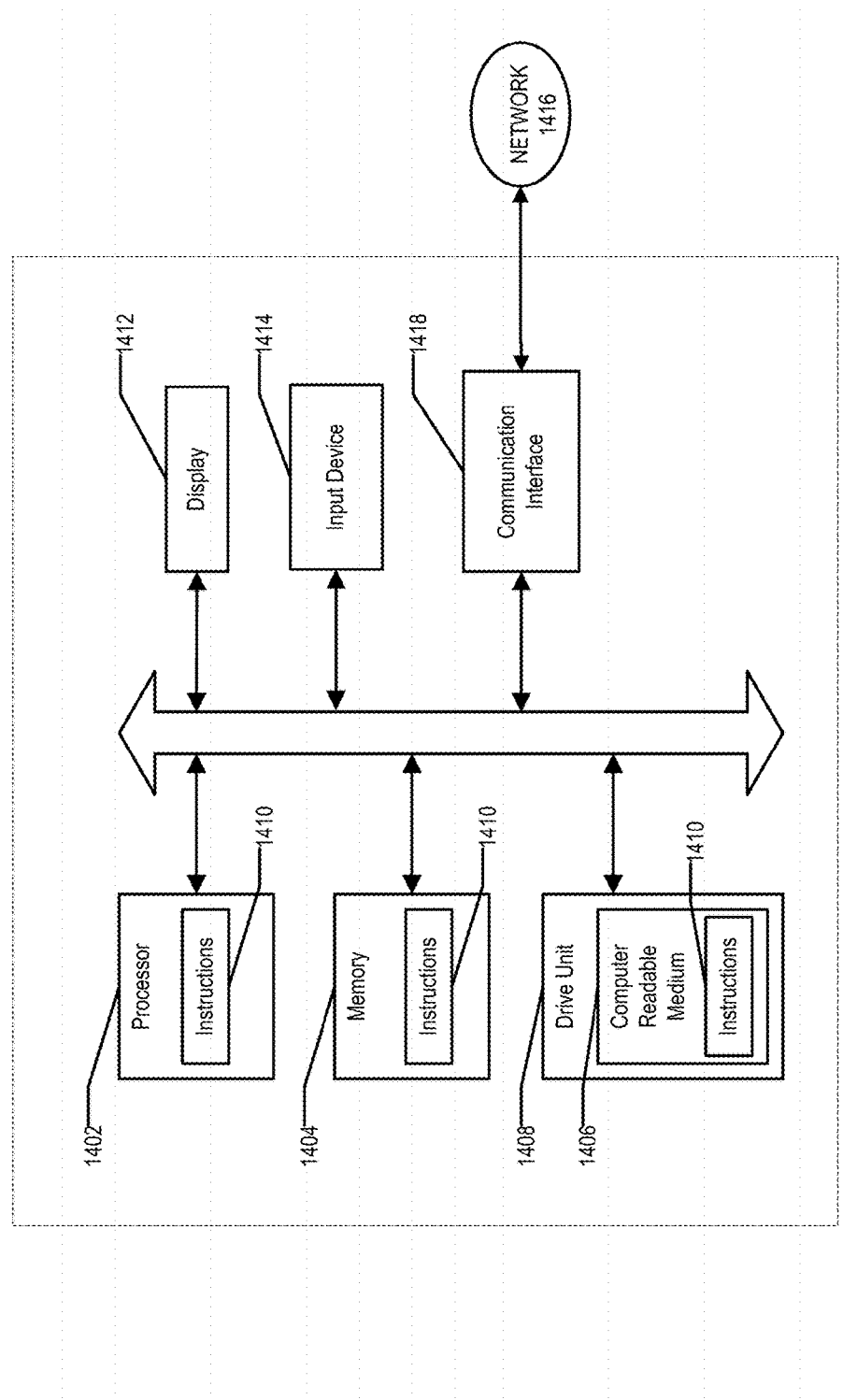
FIG. 14 illustrates an embodiment of a general computer system that may be used to implement the RARM system.
Figure 15:
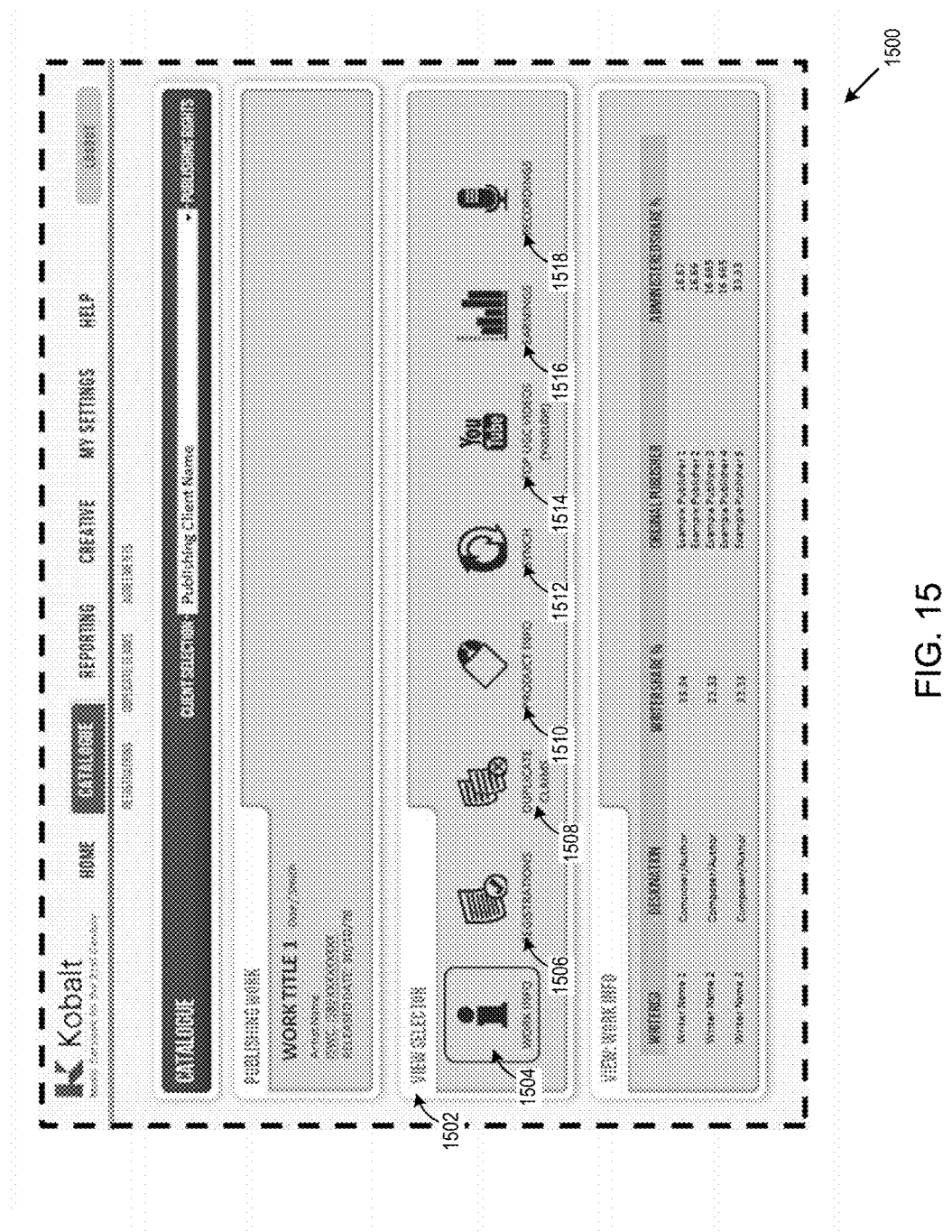
FIG. 15 is a display of an embodiment of the RARM system that illustrates a view selector with icon ribbon (banner) for click-through navigation.
Figure 16:
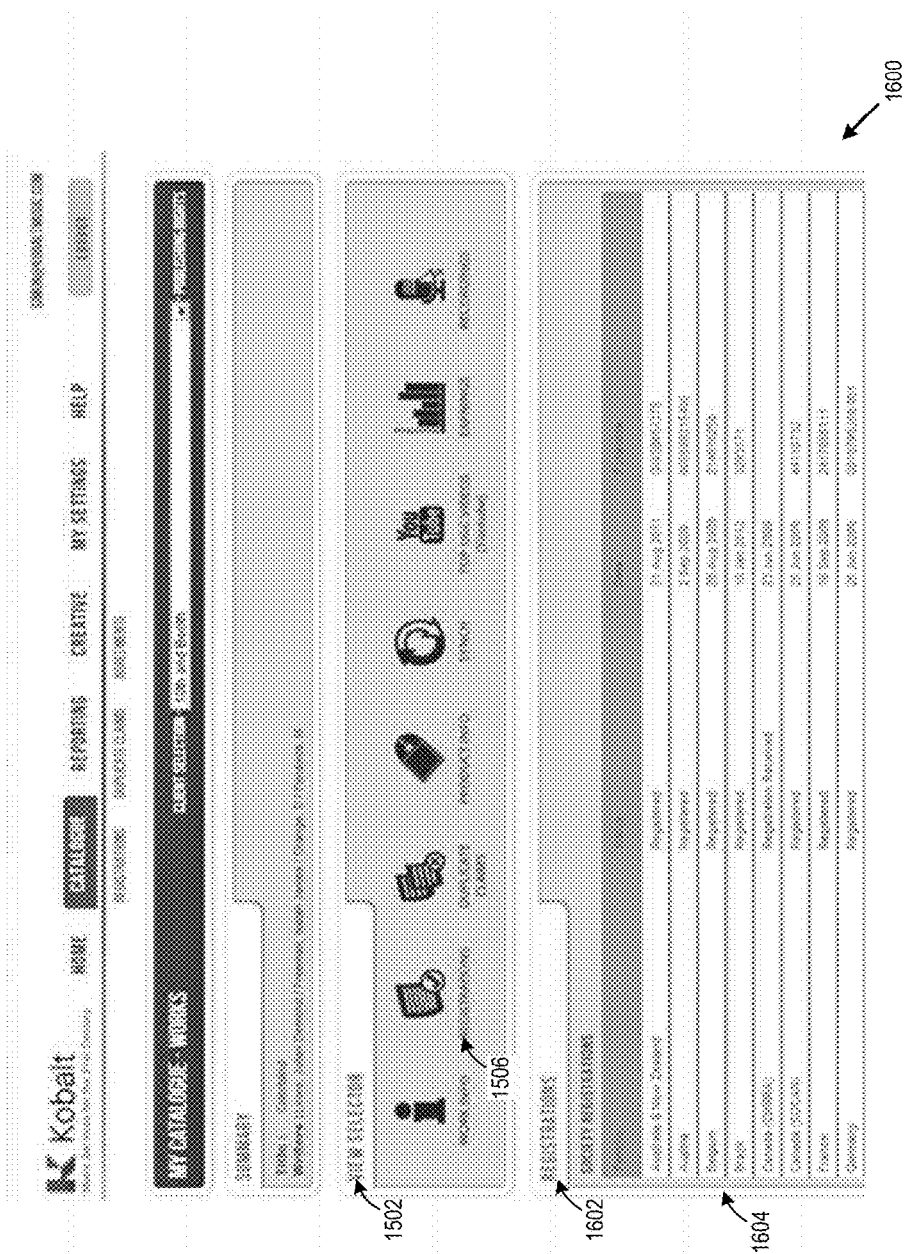
FIG. 16 is a display of an embodiment of the RARM system that illustrates a view selector with a registrations icon that displays a registration view and details.
Figure 17:
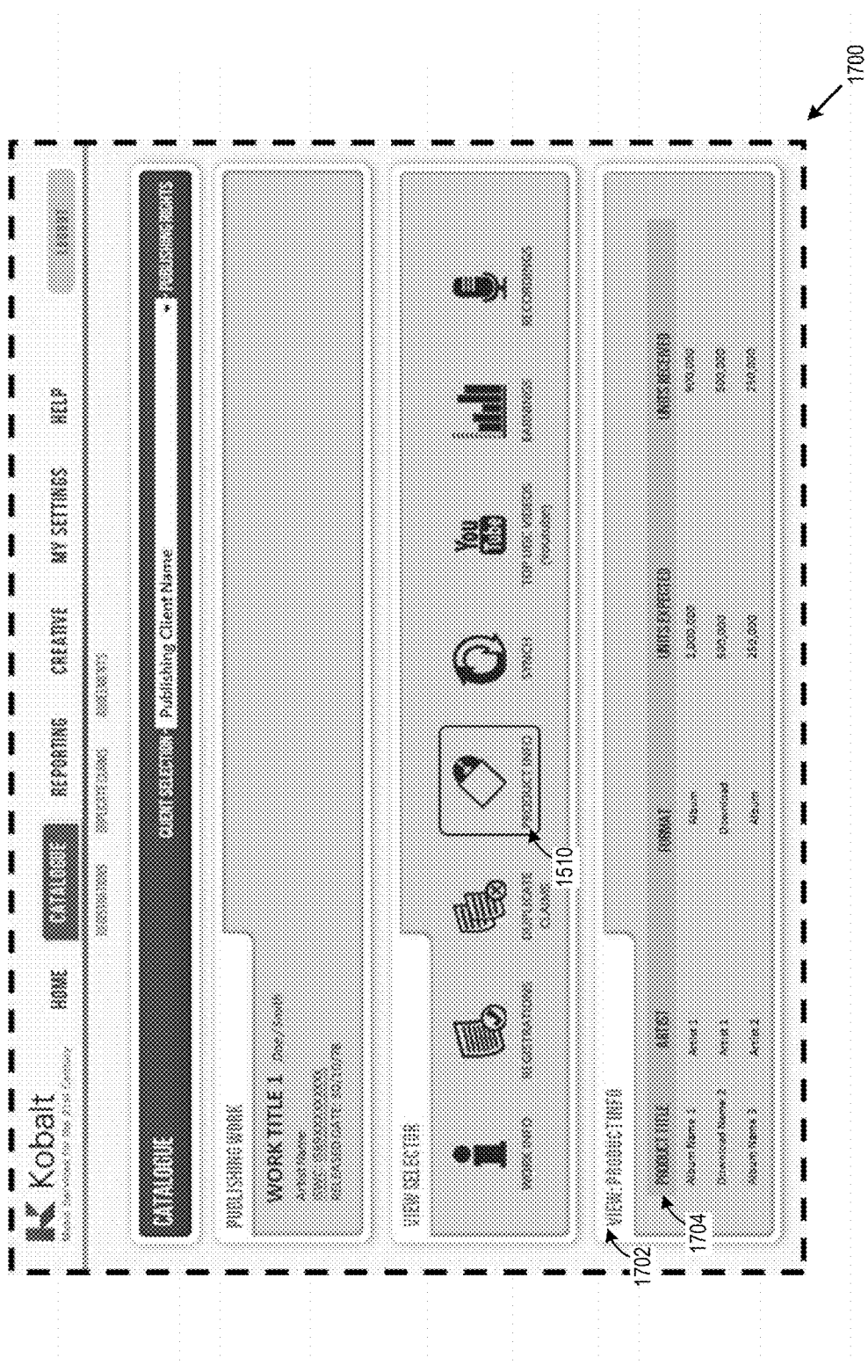
FIG. 17 is a display of an embodiment of the RARM system that illustrates a view selector with a product info icon that displays a product view and details.

Referring briefly to FIG. 15 which shows a display 1500 of an embodiment of the RARM system that illustrates a view selector with icon ribbon (banner) for click-through navigation. The icons (work info 1504, registrations 1506, duplicate claim 1508 where the client a another party claim inconsistent rights to the same work, product info 1510, synchronizations 1512, top user generated content videos 1514, earnings 1516, and recordings 1518) may represent headers linked to corresponding sub-windows (e.g., web pages and/or views) used to efficiently navigate multiple levels of granularity through the RARM data. For example, FIG. 16 shows a display 1600 of an embodiment of the RARM system that illustrates a view selector with the registrations icon 1506 that displays a registration view 1602 and details 1604. FIG. 17 is a display 1700 of an embodiment of the RARM system that illustrates a view selector with a product info icon 1510 that displays a product view 1702 and details 1704. Depending on the user role, or the metrics, some of the icons will be greyed out as non-functional for navigation. Some icons may be greyed out because the user role is not authorized to view the data on the screen that the icon is linked to. Other times, icons may be greyed out because the values for one or more of the metrics (e.g., algorithmic calculations) may be not satisfied, and data relevant to the unsatisfied metric (e.g., algorithmic calculation) on the screens linked to that icon may not be viewable FIG. 14 illustrates one embodiment of a general computer system 1400, which may represent a service provider server, or any of the other computing devices referenced herein that may be used to provide the system and methods. The computer system 1400 may include a set of instructions 1410 that may be executed to cause the computer system 1400 to perform any one or more of the methods or computer based functions disclosed herein. The computer system 1400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1400 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1410 (sequential or otherwise) that specify actions to be taken by that machine. In a particular embodiment, the computer system 1400 may be implemented using electronic devices that provide voice, video or data communication. Further, while a single computer system 1400 may be illustrated, the term "system" shall also be taken to include any collection of systems or sub-systems that individually or jointly execute a set, or multiple sets, of instructions to perform one or more computer functions.

As illustrated in FIG. 14, the computer system 1400 may include a processor 1402, such as, a central processing unit (CPU), a graphics processing unit (GPU), or both. The processor 1402 may be a component in a variety of systems. For example, the processor 1402 may be part of a standard personal computer or a workstation. The processor 1402 may be one or more general processors, digital signal processors, application specific integrated circuits, field programmable gate arrays, servers, networks, digital circuits, analog circuits, combinations thereof, or other now known or later developed devices for analyzing and processing data. The processor 1402 may implement a software program, such as code generated manually (i.e., programmed).

The computer system 1400 may include a memory 1404 that can communicate via a bus. The memory 1404 may be a main memory, a static memory, or a dynamic memory. The memory 1404 may include, but may not be limited to computer readable storage media (e.g., a non-transitory memory) such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1404 may include a cache or random access memory for the processor 1402. Alternatively or in addition, the memory 1404 may be separate from the processor 1402, such as a cache memory of a processor, the system memory, or other memory. The memory 1404 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1404 may be operable to store instructions 1410 executable by the processor 1402. The functions, acts or tasks illustrated in the figures or described herein may be performed by the programmed processor 1402 executing the instructions 1410 stored in the memory 1404. The functions, acts or tasks may be independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

The computer system 1400 may further include a display 1412, such as a liquid crystal display (LCD), an organic light emitting diode (OLED), a flat panel display, a solid state display, a cathode ray tube (CRT), a projector, a printer or other now known or later developed display device for outputting determined information. The display 1412 may act as an interface for the user to see the functioning of the processor 1402, or specifically as an interface with the software stored in the memory 1404 or in the drive unit 1408.

Additionally, the computer system 1400 may include an input device 1414 configured to allow a user to interact with any of the components of system 1400. The input device 1414 may be a number pad, a keyboard, or a cursor control device, such as a mouse, or a joystick, touch screen display, remote control or any other device operative to interact with the system 1400.

The computer system 1400 may also include a disk or optical drive unit 1408. The disk drive unit 1406 may include a computer-readable medium 1406 in which one or more sets of instructions 1410, e.g. software, can be embedded. Further, the instructions 1410 may perform one or more of the methods or logic as described herein. The instructions 1410 may reside completely, or at least partially, within the memory 1404 and/or within the processor 1402 during execution by the computer system 1400. The memory 1404 and the processor 1402 also may include computer-readable media as discussed above.

The present disclosure contemplates a computer-readable medium 1406 that includes instructions 1410 or receives and executes instructions 1410 responsive to a propagated signal; so that a device connected to a network 1416 may communicate voice, video, audio, images or any other data over the network 1416. Further, the instructions 1410 may be transmitted or received over the network 1416 via a communication interface 1418. The communication interface 1418 may be a part of the processor 1402 or may be a separate component. The communication interface 1418 may be created in software or may be a physical connection in hardware. The communication interface 1418 may be configured to connect with a network, external media, the display 1412, or any other components in system 1400, or combinations thereof. The connection with the network 1416 may be a physical connection, such as a wired Ethernet connection or may be established wirelessly as discussed below. Likewise, the additional connections with other components of the system 1400 may be physical connections or may be established wirelessly.

The network 1416 may include wired networks, wireless networks, or combinations thereof. The wireless network may be a cellular telephone network, an 802.11, 802.16, 802.20, or WiMax network. Further, the network 1416 may be a public network, such as the Internet, a private network, such as an intranet, or combinations thereof, and may utilize a variety of networking protocols now available or later developed including, but not limited to, TCP/IP based networking protocols.

The computer-readable medium 1406 may be a single medium, or the computer-readable medium 1406 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1406 may include a solid-state memory such as a memory card or other package that houses one or more non-volatile read-only memories. The computer-readable medium 1406 also may be a random access memory or other volatile re-writable memory. Additionally, the computer-readable medium 1406 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A method for providing a web portal customizable user-centric display interface, the method comprising:

receiving, using a communications interface between a royalty accounting and rights management (RARM) system and one or more third party systems, RARM data including royalty data collected identifying royalty payments, including royalty payments earned, related to exploitation of content, and reported by the one or more third party systems;

storing; into a non-transitory memory coupled with a processor, the RARM data including the royalty data and account data;

executing processor executable instructions that when executed cause the processor to:

ingest the RARM data by identifying a partner data format of the RARM data, and performing data analysis to:

identify key parameters within the royalty data;

translate the royalty data into a consistent format and data structure;

determine that particular information are not identified Within the royalty data; and communicate to said one or more third party systems a request for more information of the RARM data in response to determining that the particular information are not identified within the royalty data;

define and re-assign access preferences associated with user credentials and user access privileges for the users of the RARM system, said access preferences allowing the users to view a display of predetermined types of the RARM data for a client associated with the users;

identify the types of the RARM data for the client, the types comprising a royalty data type and an account data type;

retrieve a preset level of a metric for the client stored in memory corresponding to each of the identified types of the RARM data;

calculate for each identified type of the RARM data a value corresponding to the metric based on the RARM data for the identified type of the RARM data, wherein for the royalty data type the calculated value of the metric includes a percent of income associated with the identified type of the RARM data, and for the account data type the metric includes an unrecouped balance associated with the identified type of the RARM data;

compare for each identified type of the RARM data the corresponding preset level of the metric to the calculated value of the metric for the identified type of the RARM data;

enable display of the RARM data and display objects associated with the identified royalty data type through a display interface of the web portal coupled to the processor in response to the calculated value of the metric of the percent of income for the identified royalty data type exceeding the preset level of the metric corresponding to the identified royalty data type;

enable display of the RARM data and display objects associated with the identified account data type through the display interface in response to the calculated value of the metric of the unrecouped balance for the identified account data type exceeding the preset level of the metric corresponding to the identified account data type;

identify a user logged in to the web portal to view the RARM data for the client;

determine the predetermined types of the RARM data the identified user is allowed to view based on the access preferences associated with the identified user;

enable display of the predetermined types of the RARM data and the display objects allowed for the identified user to view through the display interface of the web portal;

determining a user role associated with a stored profile of the identified user;

enabling access to functions, navigational icons and hypertext links in the display interface of the web portal according to the determined user role;

communicate and generate in the display interface of the web portal the enabled displays of the RARM data and the display objects enabled based on the comparison of the calculated value of the metric to the preset level of the metric and which comprise the predetermined types of the RARM data allowed for the identified user to view, and the enabled functions, icons and hypertext links, thereby communicating the account status and/or the related information through the communications interface and/or the display interface based on the comparison of the calculated value of the metric to the preset level of the metric; and initiate an audible, or visual indication or both that identify the RARM data displayed, where the audible indication is a user selectable audio clip and the visual indication is a user selectable multimedia clip of a work of the client identified by the displayed RARM data.

2. The method of claim 1, the processor executable instructions further causes the processor to:
   allocate royalties identified by the royalty data to appropriate client accounts based on client criteria, including client contractual agreement terms;
   perform analysis of current earnings and account status of the client based on the allocated royalties to obtain royalties allocations information for the client.

3. The method of claim 2, wherein the identified key parameters within the royalty data include:
   Territory of use;
   media usage type including: film; TV; radio; and digital media usage types; or a combination thereof.

4. The method of claim 2, wherein identifying the key parameters within the royalty data comprises comparing the key parameters with established codes and terms to ensure the royalty data is comparable regardless of partner data formats and data irregularities.

5. The method of claim 1, further comprising:
   varying the display interface based on the royalty payments earned and class of the user.

6. The method of claim 1, the method further comprising:
   analyzing a royalty;
   determining a type of royalty, including:
      a publishing royalty for a work; and
      a recording royalty for a recording;
   identifying and allocating:
      a work for a publishing royalty;
      a recording for a recording royalty;
      a territory where the royalty originated;
      a usage type;
      a date of usage; and the client; and
   querying the one or more third party systems for more information when the system cannot determine:
      the type of royalty;
      the work for a publishing royalty:
      the recording for a recording royalty;
      the territory;
      the usage type;
      the date of usage;
      the client; or
      any combination thereof.

7. The method of claim 1, further comprising generating in the display interface navigation icons each linked to a view, where one or more navigation icons are greyed out depending on the user access privileges to access said linked view.

8. The method of claim 1, further comprising generating in the display interface navigation icons each linked to a view, where one or more navigation icons are greyed out depending on the royalty data or the calculated values of the metric for the royalty data.

9. The method of claim 2, the method further comprising:
   analyzing the calculated values of the metrics including:
      a % of income associated with TV shows, wherein a % of income associated with TV shows that satisfies a TV shows threshold varies the display interface to include TV summary components;
      a % of income associated with Film shows, wherein a % of income associated with Film shows that satisfies a Film shows threshold varies the display interface to include Film summary components;
      a % of income associated with U.S. Radio, wherein a % of income associated with U.S. Radio that satisfies a U.S. Radio threshold varies the display interface to include U.S. Radio summary components;
      a number of synchronizations, wherein the number of synchronizations that satisfies a synchronization threshold varies the display interface to include synchronization summary components;
      a % of income associated with one or more physical products, wherein a % of income associated with one or more physical products that satisfies a product threshold varies the display interface to include physical product summary components;
      a % of income associated with digital income, wherein a % of income associated with digital income that satisfies a digital threshold varies the display interface to include digital summary components;
      an amount of royalties income from products with release dates, wherein the amount of royalties income from products with release dates that satisfies a release dates threshold varies the display interface to include historic catalogue summary components;
      income of client from a video-sharing provider, wherein the income of client from the video-sharing provider that satisfies a video-sharing provider income threshold varies the display interface to include a video-sharing provider summary box; or any combination thereof.

10. The method of claim 9, wherein analyzing the calculated values of the metrics further comprises determining:
   a number of synch pitch activities, wherein the number of synch pitch activities that satisfies a synchs pitched threshold varies the display interface to include a synch pitch activity summary;
   a number of one or more sub-client statement obligations, wherein the number of one or more sub-client statement obligations that satisfy a sub-client statement obligations threshold varies the display interface to include a sub client agreements summary;
   a number of works submitted, wherein the number of works submitted that fail to satisfy a works submitted threshold varies the display interface to include warning box "No works submitted";

a number of products submitted, wherein the number of products submitted that fail to satisfy a products submitted threshold varies the display interface to include warning box "No products submitted";

a number of creative pitching activity, wherein the number of creative pitching activity that satisfies a creative pitch frequency threshold varies the display interface to include a pitch activity summary;

a frequency of exposure on current global charts, wherein the frequency of exposure on current global charts that satisfies a global charts threshold varies the display interface to include a charts data summary;

a number of terminated deals, wherein the number of terminated deals that satisfies a terminated deals threshold varies the display interface to hide a configurable proportion of the RARM data, and display financial core data;

one or more social media metrics values configured to trigger different views, wherein the one or more social media metrics values that satisfy one or more social media thresholds vary the display interface to include a social media summary; or any combination thereof.

11. The method of claim 1, wherein executing the processor executable instructions further causes the processor to:

initiate a haptic indication that identifies the royalties allocations information displayed, where the haptic indication is communicated through a device of the user.

12. The method of claim 1, the method further comprising:

determining the client associated with the user, and a user profile for the user containing a user role; and preparing a predetermined base subset of client royalty data according to predetermined access rights in accordance with the user role and transmitting the base subset of client royalty data for display.

13. The method of claim 12, wherein the user role may be reassigned to provide access to a different base subset of data associated with the reassigned user role.

14. The method of claim 12, the method further comprising:

identifying a plurality of predetermined metrics associated with the client; calculating a plurality of metrics based on the client royalty data corresponding to the predetermined metrics;

determining whether the calculated metrics includes any values that satisfies any of the corresponding plurality of predetermined metrics;

for each of the satisfied predetermined metrics, preparing a subset of client royalty data associated with the satisfied predetermined metric for display on the web portal to supplement the base subset of client royalty data; and communicating a display of an aggregation of the base subset and supplemental subsets of client royalty data to provide a customizable user-centric display of data subsets in the web portal.

15. The method of claim 14, wherein the user role may be reassigned to provide access to a different base subset of data associated with the reassigned user role.

16. The method of claim 14, wherein for each of the satisfied predetermined metrics, the user is provided access to additional functions, additional icons and additional hypertext links associated with the displayed subset of client royalty data.

17. The method of claim 14, wherein calculating the plurality of metrics based on the client royalty data comprises calculating a metric associated with a category of royalty income source, the calculated metrics including a percentage of income associated with TV shows, a percentage of income associated with Film shows, a percentage of income associated with U.S. Radio, a percentage of income associated with Synchronization, a percentage of income associated with one or more physical products, a percentage of income associated with digital income, and a percentage of royalties on products with release dates; and wherein the supplemental data subsets include client royalty data associated with the category of royalty income source.

18. The method of claim 1, wherein executing processor executable instructions that when executed cause the processor to further:

identify a registration data type of the RARM data for the client;

retrieve the preset level of the metric for the client stored in memory corresponding to the identified registration data type of the RARM data;

calculate the value of the metric associated with the RARM data for the identified registration data type of RARM data, wherein for the identified registration data type the calculated value of the metric includes a number of works registered by territory associated with the identified registration data type of RARM data; and determine to generate a display of the RARM data associated with the identified registration data type if the calculated value of the metric of the number of works registered by territory for the identified registration data type exceeds the preset level of the metric corresponding to the identified registration data type.

19. The method of claim 1, wherein executing processor executable instructions that when executed cause the processor to further:

retrieving archived rules governing the format of the RARM data received from a first source;

reformatting the RARM data received from the first source according to the retrieved archived rules; and formatting client specific data to comply with internet protocol standards to enable transmission to the client.

20. The method of claim 1, wherein executing processor executable instructions that when executed cause the processor to further:

analyze the RARM data based on geolocation data associated with the RARM data, determine whether the RARM data for a specific geolocation is significant;

automatically display a set of targeted views that provide more detailed information related to the specific geolocation determined to be significant.

* * * * *

UNITED STATES PATENT AND TRADEMARK OFFICE
CERTIFICATE OF CORRECTION

PATENT NO. : 10,319,040 B1
APPLICATION NO. : 13/829664
DATED : June 11, 2019
INVENTOR(S) : Willard Bengt Anders Ahdritz et al.

It is certified that error appears in the above-identified patent and that said Letters Patent is hereby corrected as shown below:

In the Specification

Column 20, Line 18, for the first instance of "claim", delete "claim" and insert in its place --claims--.

In the Claims

Column 24, Claim 1, Line 16, delete "Within" and insert in its place --within--.

Signed and Sealed this
Twenty-sixth Day of November, 2019

Andrei Iancu
*Director of the United States Patent and Trademark Office*